US008546748B2

(12) United States Patent
Hughes et al.

(10) Patent No.: US 8,546,748 B2
(45) Date of Patent: Oct. 1, 2013

(54) HELIUM BARRIER ATOM CHAMBER

(75) Inventors: Kenneth Jeramiah Hughes, Lafayette, CO (US); Charles Ackley Sackett, Charlottesville, VA (US); Archie Theodore Brown, Longmont, CO (US)

(73) Assignee: Triad Technology, Inc., Longmont, CO (US)

( * ) Notice: Subject to any disclaimer, the term of this patent is extended or adjusted under 35 U.S.C. 154(b) by 0 days.

(21) Appl. No.: 13/441,466

(22) Filed: Apr. 6, 2012

(65) Prior Publication Data

US 2012/0258022 A1   Oct. 11, 2012

Related U.S. Application Data

(60) Provisional application No. 61/516,758, filed on Apr. 7, 2011.

(51) Int. Cl.
*B65D 25/54* (2006.01)
*B01J 19/00* (2006.01)
*C03B 32/00* (2006.01)

(52) U.S. Cl.
USPC ........................................ 250/251

(58) Field of Classification Search
USPC ........................................ 250/251
See application file for complete search history.

(56) References Cited

U.S. PATENT DOCUMENTS

| | | | |
|---|---|---|---|
| 3,473,863 A * | 10/1969 | Lewis | 359/297 |
| 5,528,028 A * | 6/1996 | Chu et al. | 250/251 |
| 5,594,231 A * | 1/1997 | Pellicori et al. | 428/408 |
| 6,265,038 B1 * | 7/2001 | Frisk | 428/34.7 |
| 7,126,112 B2 * | 10/2006 | Anderson et al. | 250/251 |
| 7,807,509 B2 | 10/2010 | McBride | |
| 2008/0100206 A1 * | 5/2008 | Kondo et al. | 313/504 |
| 2009/0095414 A1 * | 4/2009 | McBride | 156/273.7 |
| 2009/0097256 A1 * | 4/2009 | Takahashi et al. | 362/296.01 |
| 2009/0242743 A1 * | 10/2009 | Bouyer et al. | 250/251 |
| 2010/0126660 A1 * | 5/2010 | O'Hara | 156/249 |
| 2010/0203340 A1 * | 8/2010 | Ruoff et al. | 428/408 |
| 2011/0152820 A1 * | 6/2011 | Chattaraj et al. | 604/403 |
| 2011/0236609 A1 * | 9/2011 | Jones | 428/34 |

OTHER PUBLICATIONS

Hobson, J.P., "Measurement with a modulated Bayard-Alpert Gauge in Aluminosilicate Class at Pressures below 10-12 Torr" J. Vac. Sci. Technol. 1, 1 (1964).*
Triad Anti-Reflection Coated Reference Cells Specification document.
Triad Wavelength Reference Cells Brochure.

* cited by examiner

*Primary Examiner* — David A Vanore
*Assistant Examiner* — Wyatt Stoffa
(74) *Attorney, Agent, or Firm* — Patent Law Offices of Rick Martin, P.C.

(57) ABSTRACT

The present invention discloses a vacuum chamber having operating pressures in the ultra-high vacuum (UHV) range ($10^{-8}$ torr to $10^{-13}$ torr) and incorporating transparent windows, said windows constructed from transparent materials (preferably glass), and having low helium permeability velocity under operating and storage conditions. Embodiments may also contain surface coatings on windows to reduce helium permeation. Also disclosed herein is a method for vacuum processing said chamber by heating entire chamber and exposing the inside and outside of the chamber windows to helium free environments. Methods for final sealing said chamber are also discussed. The vacuum chamber is useful as a container for optically-cooled atoms for use in quantum information and atomic clocks and as a sensor for magnetic fields, gravitational fields, and inertial effects.

13 Claims, 19 Drawing Sheets

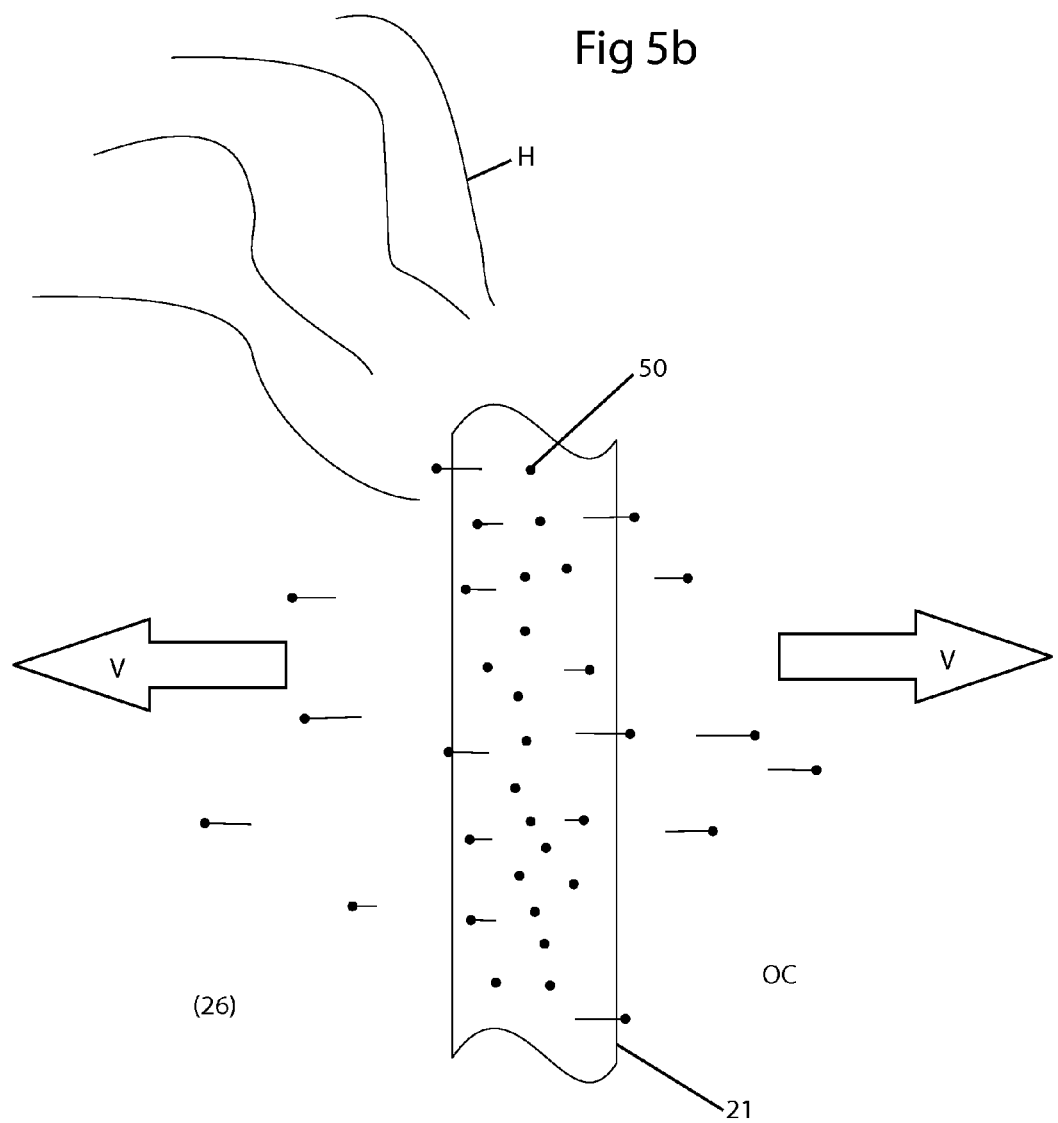

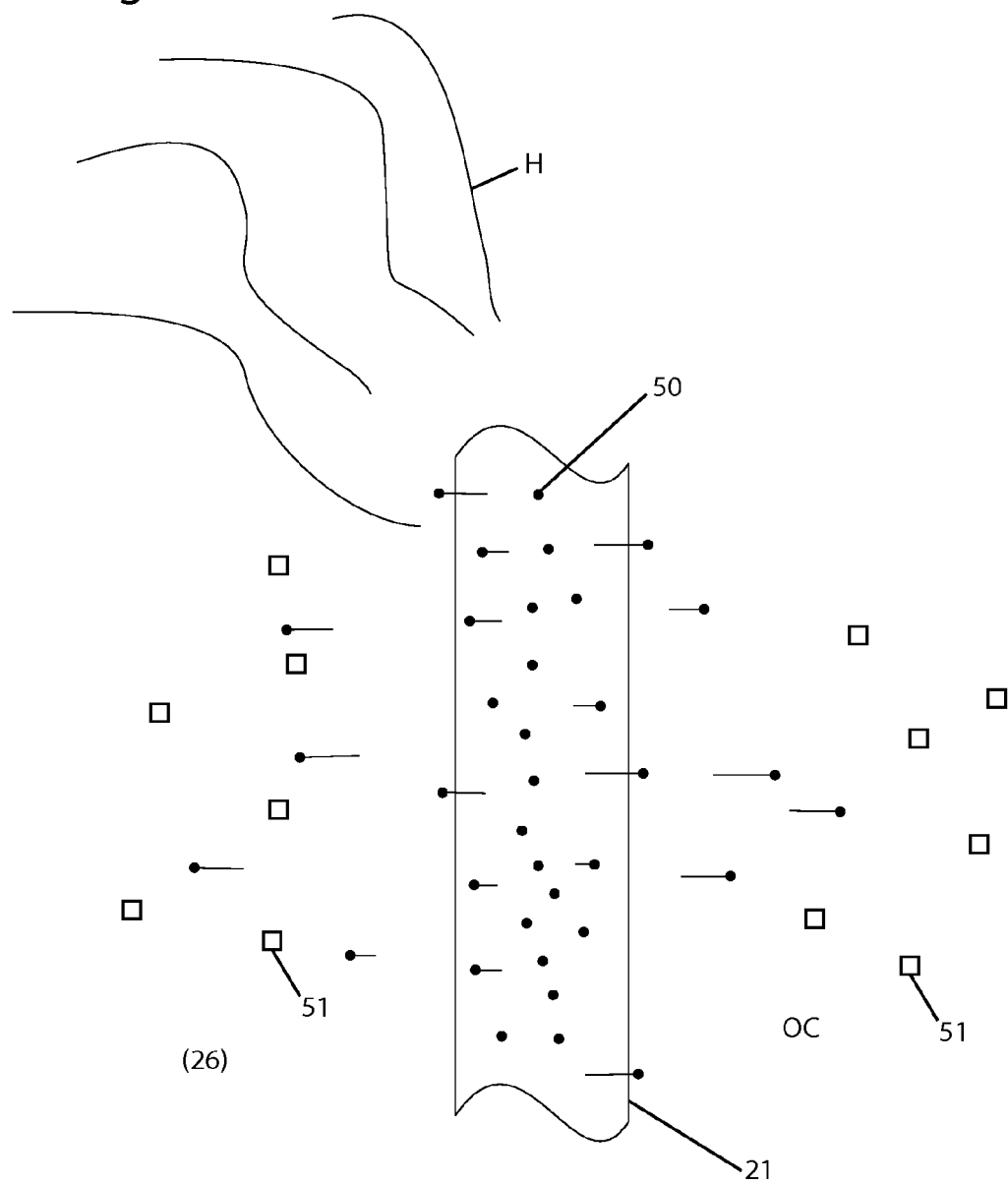

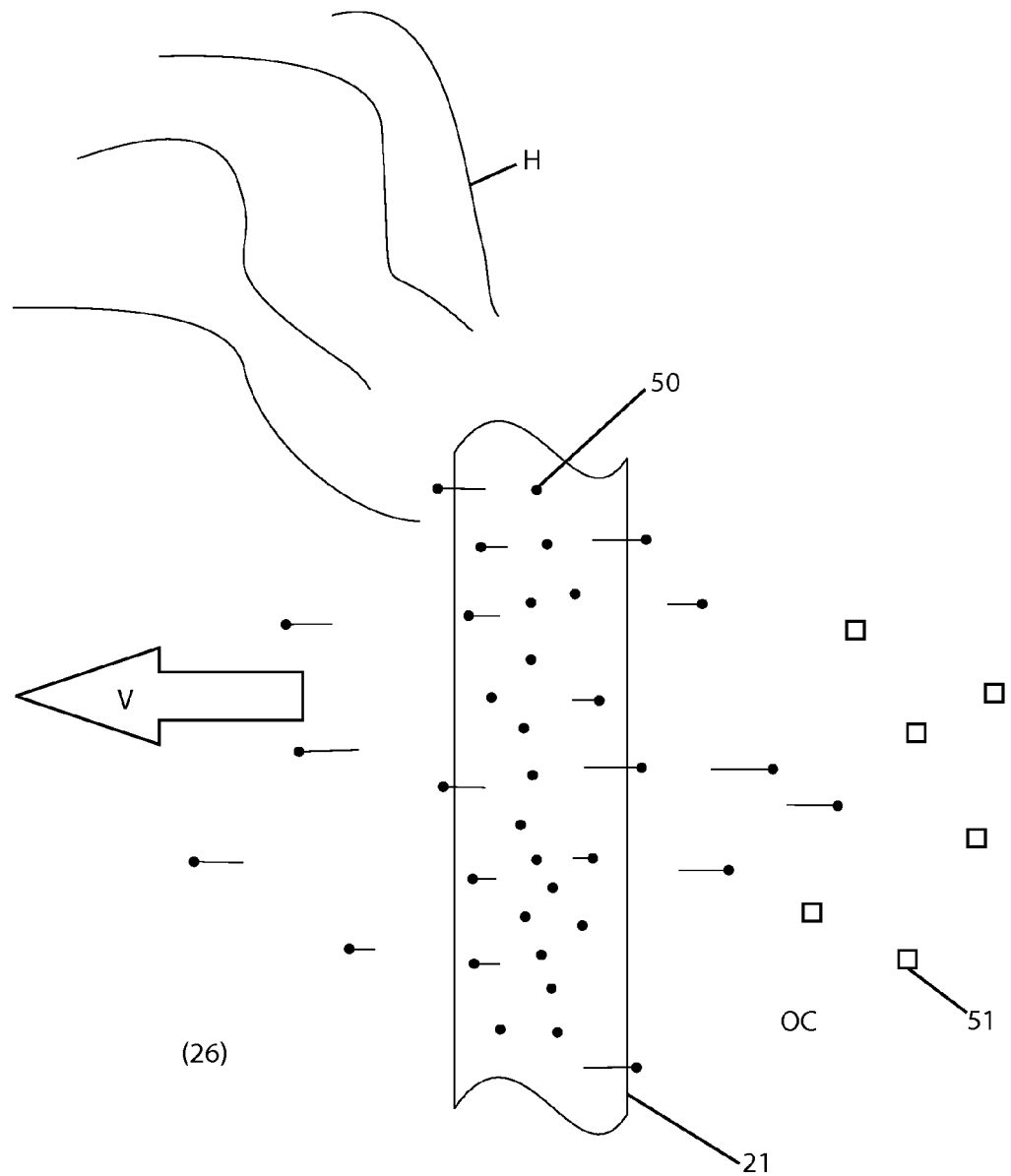

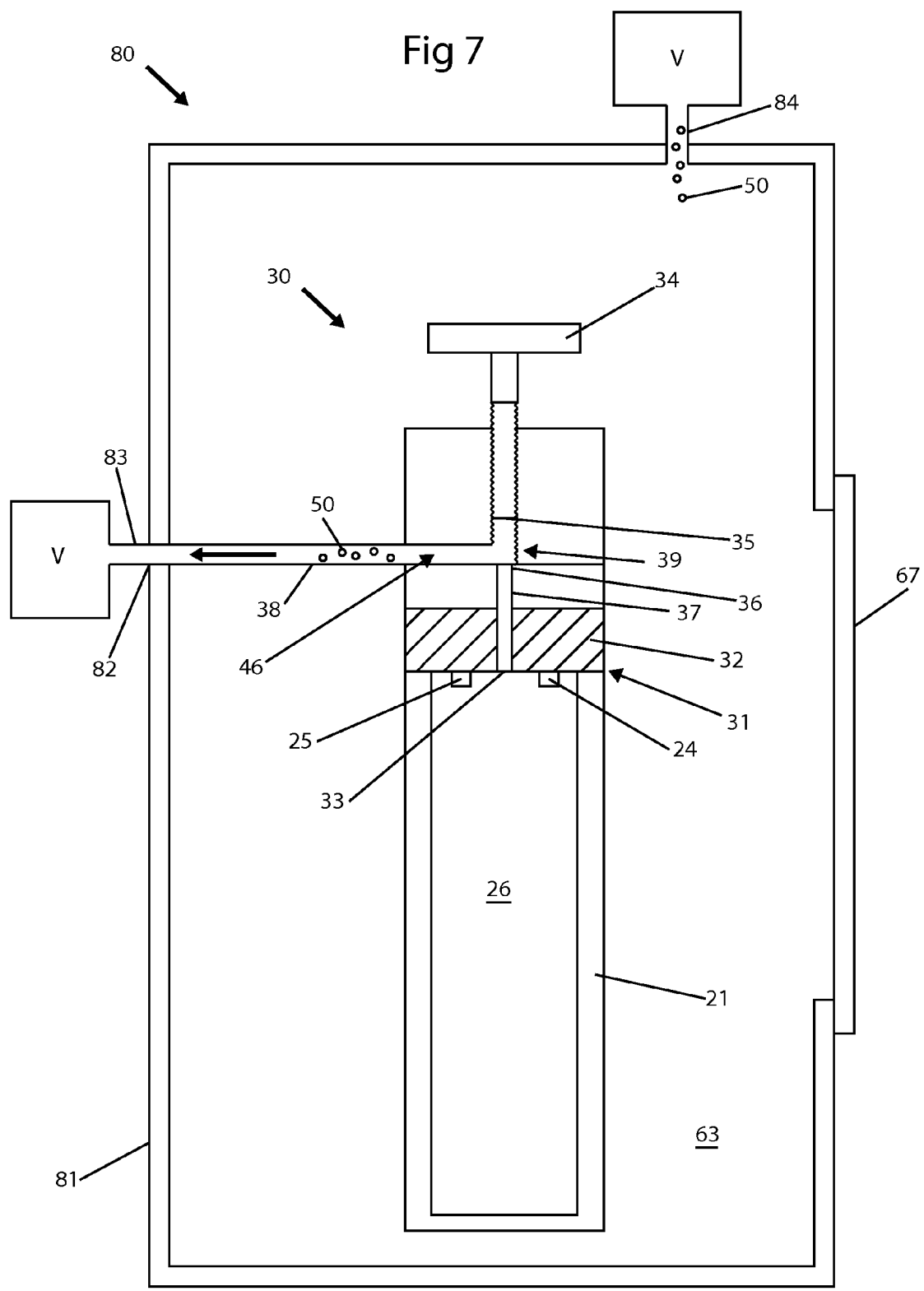

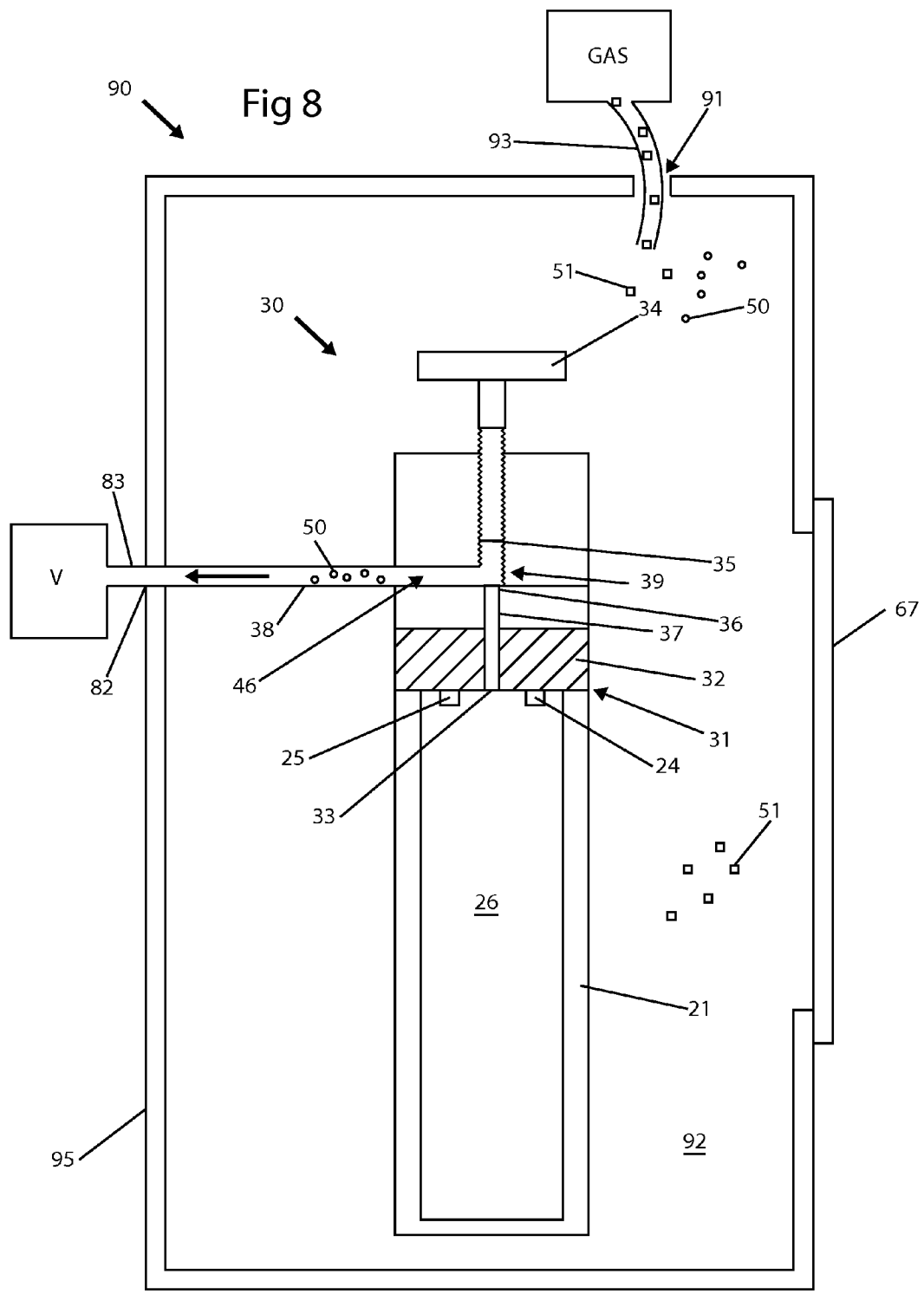

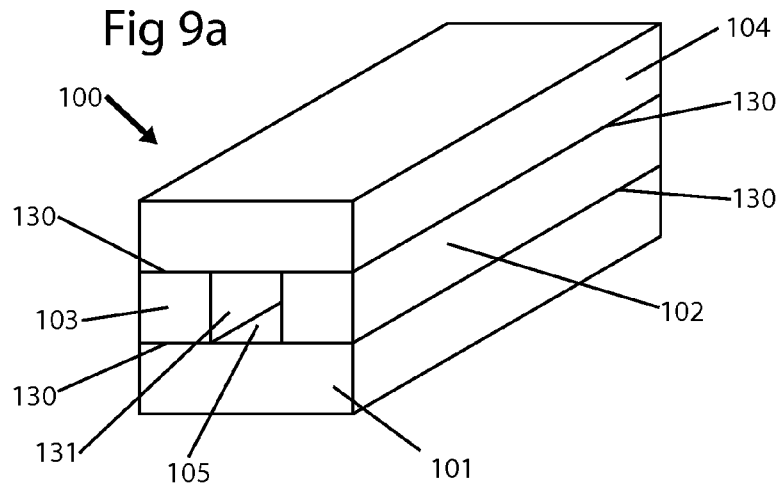
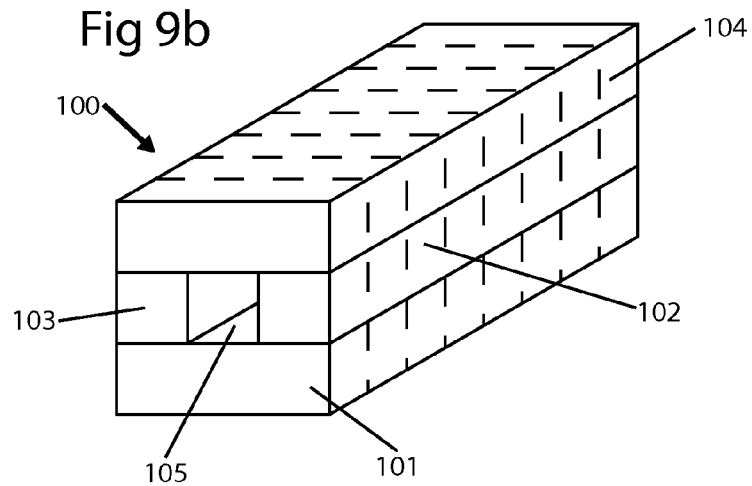
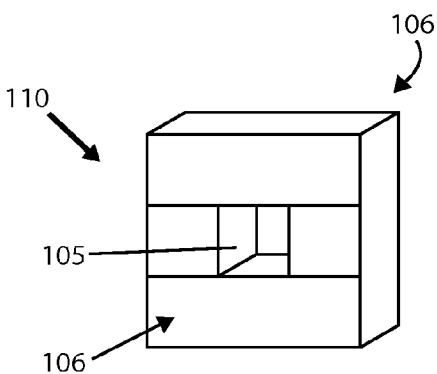

HELIUM BARRIER ATOM CHAMBER

This application is a non-provisional application claiming the benefits of provisional application no. 61/516,758 filed Apr. 7, 2011.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract No. N68335-10-C-0508 awarded by the Naval Air Systems Command (NAVAIR) of the U.S. Department of Defense (DoD).

FIELD OF THE INVENTION

This invention relates to a vacuum chamber constructed with optical windows made to have a high resistance to helium leakage, and a fabrication and processing method thereof.

BACKGROUND OF THE INVENTION

The proposed applications that can benefit from cold and ultracold atom technology includes atom interferometry, quantum computing, nonlinear optics, atom interaction studies, atomic timekeeping, inertial navigation, magnetic sensing, and gravitational sensing. One serious obstacle to developing these applications has been the complexity and size of the vacuum systems required for ultracold atom production. Although recent scaled-down vacuum systems intended for producing Bose Einstein condensation (BEC) have begun to address this issue, there remains much that is still required in terms of miniaturization and reducing system complexity.

Active vacuum pumps like sputter-ion pumps and turbo pumps have become ubiquitous in cold and ultracold atom systems. In general, these pumps provide convenience, ease of use, and the ultra-high vacuum (UHV) conditions ($10^{-8}$ torr to $10^{-13}$ torr) required for producing optically cooled and ultracold matter. A sputter ion pump works by ionizing vacuum impurities in the volume of the pump. A high voltage accelerates the ions toward the walls of the pump where they are sequestered via burial deep into the wall or by chemical reaction with the materials that form the wall. A turbo pump is a mechanical pump that uses spinning turbine blades to create a preferred direction of flow of vacuum impurities out of the volume of the chamber. There are several drawbacks to using these active vacuum pumps and these drawbacks become more significant under miniaturization for use in sensory applications based on optically cooled atoms.

Active pumps such as sputter ion pumps and mechanical turbo pumps have better pumping capability if they are large. Under miniaturization, the pumping capability of these active pumps is reduced to a point of diminishing returns. The large physical size of the active pump itself is a major limitation and dictates the ultimate size of the source. Furthermore, as cold atom vacuum chambers get smaller in size, the active pumps must be closer in proximity to the collections of cold and ultracold atoms. Stray magnetic fields from active vacuum pumps can have a detrimental effect on cold atom-based sensors. The effects of these stray fields are accentuated in smaller systems and it becomes increasingly difficult to shield the atoms from them. Elimination of such pumps can enable further miniaturization of ultracold atom sources and spur application development.

Traditional vacuum systems utilized in the production of optically cooled atoms and ultracold atoms (such as BEC) are large in size. It is common for these systems to weigh between 10 kg and 50 kg with length of about 1 meter in at least one physical dimension. These systems incorporate heavy suitcase-sized active pumps such as sputter ion pumps or mechanical turbo pumps to maintain the low pressures required for producing collections of cold and ultracold atoms. The required pressures can vary from as high as about $10^{-8}$ torr to about $10^{-13}$ torr depending on the goal of the apparatus. The chambers contain a mechanism to dispense the atoms of interest; typically alkali atoms such as rubidium or cesium. Atoms are dispensed into the chamber to form a low-density room-temperature vapor that can be cooled and confined in a magneto-optical trap (MOT). Traditional vacuum systems for producing ultracold matter can be based on a two-chamber design where the chambers are coupled using a narrow tube or aperture. A single-chamber design can also be used for optical cooling, however, the two-chamber design gives better vacuum performance albeit, at the cost of greater system size and complexity.

The present invention addresses the need for a miniature vacuum chamber with reduced reliance on active pumping to be used as a source for ultracold atoms. A UHV vacuum chamber is formed that eliminates or reduces the use of active vacuum pumps and further provides a simplified geometry for producing ultracold matter. The primary challenge in creating such a chamber is managing the permeation of substances, called vacuum impurities, into the vacuum chamber which add to the background pressure and spoil the necessary UHV conditions. Of particular concern is helium as a vacuum impurity. Helium is naturally found in the air and can readily diffuse through many window materials. Furthermore, helium is not effectively pumped by any passive getter material. The present invention provides a helium impervious window in a vacuum chamber used for atom cooling, trapping, and probing.

SUMMARY OF THE INVENTION

The present invention is a vacuum chamber for working with cold and ultracold atoms that can maintain ultra-high vacuum levels in a closed cavity with minimal or no active pumping. The chamber incorporates optical windows allowing atoms or molecules on the inside of the cavity to be addressed with light. One example of an application for which the vacuum chamber is well suited is the application of optically cooling atoms, ions, or molecules, but this invention is not limited to such applications and for one skilled in the art, it is easy to imagine other applications or fields for which this invention can be applied with minimal or no modification. The optical portions of the chamber are constructed from transparent materials having a helium permeability velocity below about $1\times10^{-13}$ cm$^2$/s, the material made from ingredients preferably having an alumina content over about 4% by weight. The chamber may contain passive vacuum pumping in the form of an atom collector. Additionally, the chamber may contain a device for depositing atoms or molecules of specific species into the volume of the vacuum chamber which will be referred to in the text as a target atom injector.

A critical component of this invention is the method for processing the window material so that it has a reduced concentration of helium that is dissolved in the material.

The method of vacuum processing is a key part of this invention. The process of obtaining vacuum levels with sufficiently low pressures requires the vacuum chamber to be temporarily connected to a vacuum pumping apparatus or enclosed within a processing chamber that is connected to a pumping apparatus. The temperature of the chamber is elevated to between about 50 C and 450 C to liberate vacuum impurities. These vacuum impurities may contain surface impurities with high vapor pressures which are common on materials which have been exposed to normal atmosphere. They may also contain impurities trapped within the bulk of the glass and other materials that make up the vacuum chamber. Impurities include, but are not limited to, water vapor, hydrocarbons, nitrogen, hydrogen, oxygen, $CO_2$, and noble gases(for example, helium). The temperature of the pumping apparatus or the temperature of a processing chamber connected to the pumping apparatus may also be elevated during the processing procedure to increase pumping speed and as a means of indirectly heating the chamber inside the processing chamber. During pumping and heating some of these impurities contained in the bulk material migrate to the surface where they can be pumped away by the pumping apparatus. The temperature of the chamber is raised to between about 50 C and 450 C to increase the rate of impurity migration out of the vacuum chamber materials. One example of an impurity that is critical to remove from the bulk of the vacuum chamber material is helium. Helium is found in the atmosphere at a partial pressure of about $4\times10^{-3}$ torr and because it is small and chemically non-reactive, it readily permeates through many materials. For materials used in a vacuum system with minimal or no active pumping, the dissolved helium impurity leads to serious vacuum contamination. Impurities are removed from all sides of the vacuum chamber materials by subjecting the exposed inner and outer surfaces to an environment (preferably a vacuum) that contains a low concentration of helium. One method is performed by enclosing the whole vacuum chamber within a vacuum processing enclosure. An alternate method can be performed by having a separate processing apparatuses for the inside of the vacuum chamber and one for the outside of the vacuum chamber. The method for removing helium from the bulk of the material is called degassing and is performed by baking the material or complete vacuum chamber in a helium free atmosphere. The mentioned atmosphere may be composed of a vacuum, or it may be a helium free purge gas. Low concentrations of helium will generally be achieved in the processing chamber by vacuum pumps that actively remove helium atoms from the volume of the processing chamber which represents the environment to which the surface of the vacuum chamber material is exposed during processing. The duration of vacuum processing of the vacuum chamber extends from between about $3\times10^1$ seconds to about $3\times10^7$ seconds. One alternative is to use a purge system incorporating a gas that has low helium partial pressure less than about $10^{-8}$ torr. The purge gas should be chosen as to not readily contaminate the bulk material of the chamber. As one example, high-purity nitrogen may be used as the purge gas to reduce the amount of helium located in the bulk of the material. Processing with a purge gas extends from about about $3\times10^2$ seconds to about $3\times10^7$ seconds. Purge gas processing, used on both the interior and exterior of the vacuum chamber material to reduce helium content, is followed by vacuum processing to remove the purge gas from the interior of the vacuum chamber. Purge gas can also be used on the exterior of the vacuum chamber cavity, with vacuum processing being used separately to process the interior of the cavity. Processing with a purge gas on the exterior of the cavity and vacuum processing of the interior of the cavity extends in time from about $3\times10^2$ seconds to about $3\times10^7$ seconds.

One example of a vacuum cell without active pumping is formed with optical windows composed of a transparent material (preferably glass) with helium permeability velocity below about $1\times10^{-13}$ cm^2/s. The windows can be formed into a body structure using a variety of leak-tight bonding techniques including, but not limited to glass fusing, diffusion bonding, anodic bonding or optical contacting. The body structure can be made to have a variety of shapes, including but not limited to, a tube with a round cross section, a tube with a square cross section, or an irregular geometric structure. The body structure can be attached to a metal flange by melting one edge of the glass body and bringing the molten part of the glass in contact with a metal edge. When the assembly is cooled, the interface between the glass and metal forms a leak-tight seal known in the art as a glass-to-metal seal. A target atom injector is placed within the cavity of the cell and can be affixed to the walls of the body structure or affixed to a separate metal flange that then attaches to the flange having the glass-to-metal seal. As an option, the target atom injector may be left unconstrained within the cavity. An atom collector is placed within the cavity of the cell and can be affixed to the walls of the body structure or affixed to a separate metal flange that then attaches to the flange having the glass-to-metal seal. A metal valve may be incorporated into the structure by attaching with a metal flange. The flange need not be removable. Optionally, a metal tube known in the art as a pinchoff tube can be used in place of the metal valve or in addition to the metal valve for sealing the vacuum chamber after sufficient vacuum processing as described above. The valve is closed by rotating a threaded plunger. The pinchoff tube is sealed by squeezing the tube together from the outside until a leak-tight cold weld bond is formed to and the tube is severed.

Building upon this example, a vacuum cell as above can be constructed that includes a processing port which can be opened and resealed or cut off and replaced. After sufficient operating time has elapsed such that the vacuum quality of the chamber is not favorable, the cell can be "recharged" by attaching it to a vacuum pumping apparatus for reprocessing via the processing port.

Helium permeation rates can alternatively be reduced by coating the vacuum chamber walls with a material having low helium permeability. Possible mat 1 s include, but are not limited to, graphene and aluminum oxide. The coating may be applied to the inside of the chamber, the outside of the chamber, or both. The coating may be applied prior to, subsequent to, or as part of the vacuum processing described above.

To complete the process of vacuum processing the vacuum chamber, a final vacuum-tight seal must be made before disconnecting the vacuum chamber from the vacuum pumping apparatus. Prior art shows that a vacuum chamber may be sufficiently sealed using a pinchoff tube that, when squeezed together using a tool, forms a leak-tight cold weld. During the pinch process, the pinchoff tube is severed and the vacuum chamber is freed from the vacuum processing apparatus. In prior art a commercial vacuum valve can be used for a final or intermediate vacuum seal. The vacuum valve consists of a threaded plug that, when turned, seats against a sealing surface to form a vacuum seal. The use of a pinchoff tube and a vacuum valve can be used on vacuum chambers as described above that incorporate a glass-to-metal seal.

Another way to seal the vacuum chamber is by placing a plug over an evacuation port in the vacuum chamber and then producing a leak-tight bond at the interface between the vacuum chamber and the plug. The bond can be formed using optical contacting. For optical contacting, the plug and a mating surface on the vacuum chamber must have a flatness ranging from about lambda/5 to about lambda/50 and are preferably made from the same material. The surface of the plug and mating surface of the vacuum chamber are thoroughly cleaned prior to processing. After evacuation, the seal is formed by bringing the plug in contact with the mating surface of the vacuum chamber. The movement of the plug relative to the vacuum chamber is accomplished using a vacuum compatible position translator. Heat may be applied at the interface to strengthen the bond. A leak-tight seal is formed.

If the plug is made of silicon or metal, the seal may be performed using anodic bonding. For anodic bonding, the plug and a mating surface on the vacuum chamber must have a flatness ranging from about lambda/5 to about lambda/50. The surface of the plug and mating surface of the vacuum chamber are thoroughly cleaned prior to processing. A seal based on anodic bonding is performed by bringing the plug in contact with the mating surface of the vacuum cell. The interface is heated using an internal heater to a temperature ranging from about 50 C to about 450 C. Using internal electrodes, a high voltage is applied to the silicon ranging from about 500 volts to about 2000 volts relative to the glass. A leak-tight seal is formed.

A seal may also be formed using a thin film of indium between the plug and the mating surface of the vacuum cell. After evacuation of the vacuum cell, the plug is brought into contact with the mating surface of the vacuum chamber. The indium film is sandwiched between the plug and mating surface of the vacuum chamber. Heat is applied to the bond interface with an internal heater a leak-tight seal is formed.

Other aspects of this invention will appear from the following description and appended claims, reference being made to the accompanying drawings forming a part of this specification wherein like reference characters designate corresponding parts in the several views.

BRIEF DESCRIPTION OF THE DRAWINGS

FIG. 5b Cross-section of the window during the present invention degassing method using a vacuum.
FIG. 5c Cross-section of the window during the present invention degassing method using a purge gas.
FIG. 5d Cross-section of the window during the present invention degassing method using a combination of vacuum and purge gas.
FIG. 7 Proposed alternate schematic drawing of vacuum chamber processing and degasification setup.
FIG. 8 Proposed alternate schematic drawing of vacuum chamber processing and degasification setup.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE INVENTION

Figure 1:
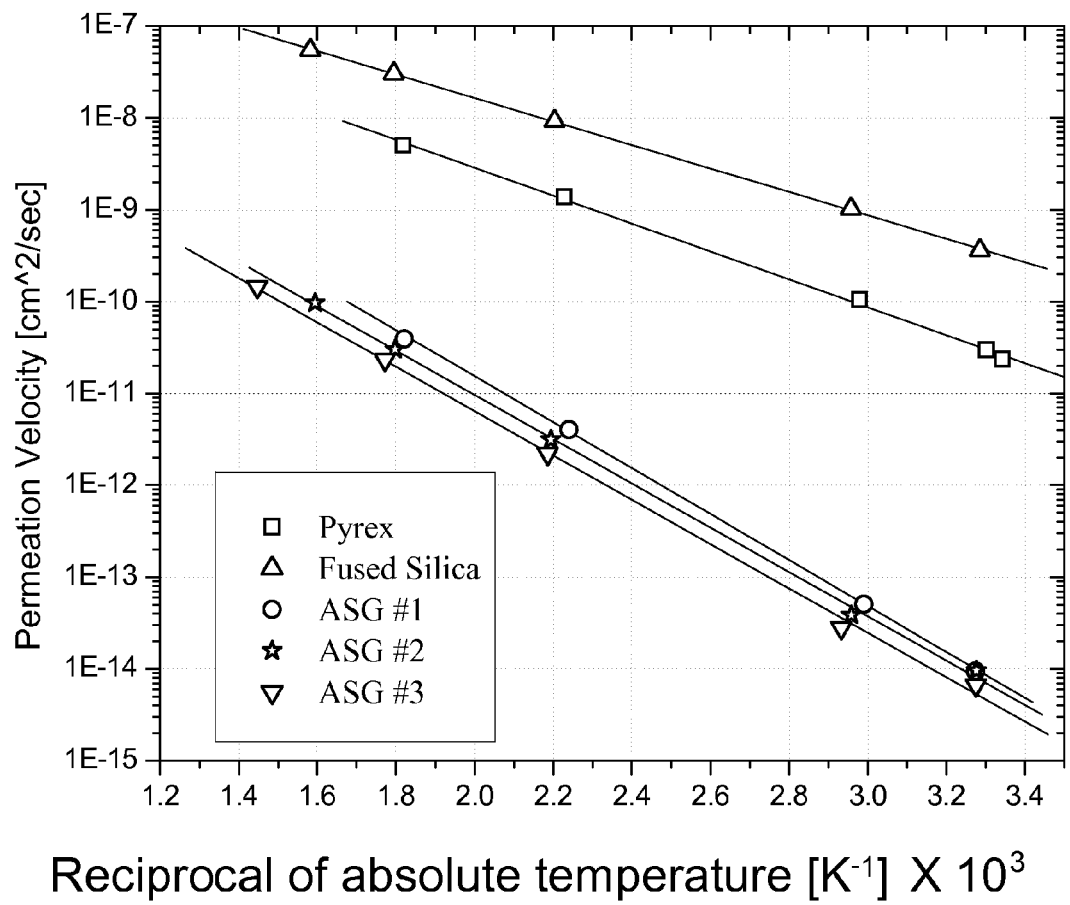
FIG. 1 Measurement results of helium permeation for different types of material.

Referring first to FIG. 1 the horizontal component represents reciprocal of the absolute temperature in Kelvin times 1000 of the test glass under vacuum in the range of $10^{-3}$ torr to $10^{-10}$ torr. The following prior art glasses were used to construct bulbs and the bulbs were used to characterize the helium permeation velocity (the vertical component) of the materials: one borosilicate glass bulb, one fused silica glass bulb, and three aluminosilicate glass (ASG #1, ASG #2, ASG #3) bulbs. The size of the bulbs were about spherical in shape with an outer dimension of about 17 mm to about 20 mm with wall thickness of about 0.2 mm to about 1.5 mm. ASG #1 is Corning(R) 1720 ignition tube glass having 59.2% $SiO_2$, 4.6% $B_2O_3$, 22.2% $AL_2O_3$, 4.4% CaO, and 9.9% MgO. ASG #2 is Schott(R) 8252 aluminosilicate glass. ASG #3 is Schott (R) 8436 sapphire sealing glass. These aluminosilicate glasses have common uses in constructing high_temperature_combustion tubes, producing glass thermometers, and sealing to metal electrodes and flanges as in the case of high temperature halogen light bulbs.

Figure 2A:
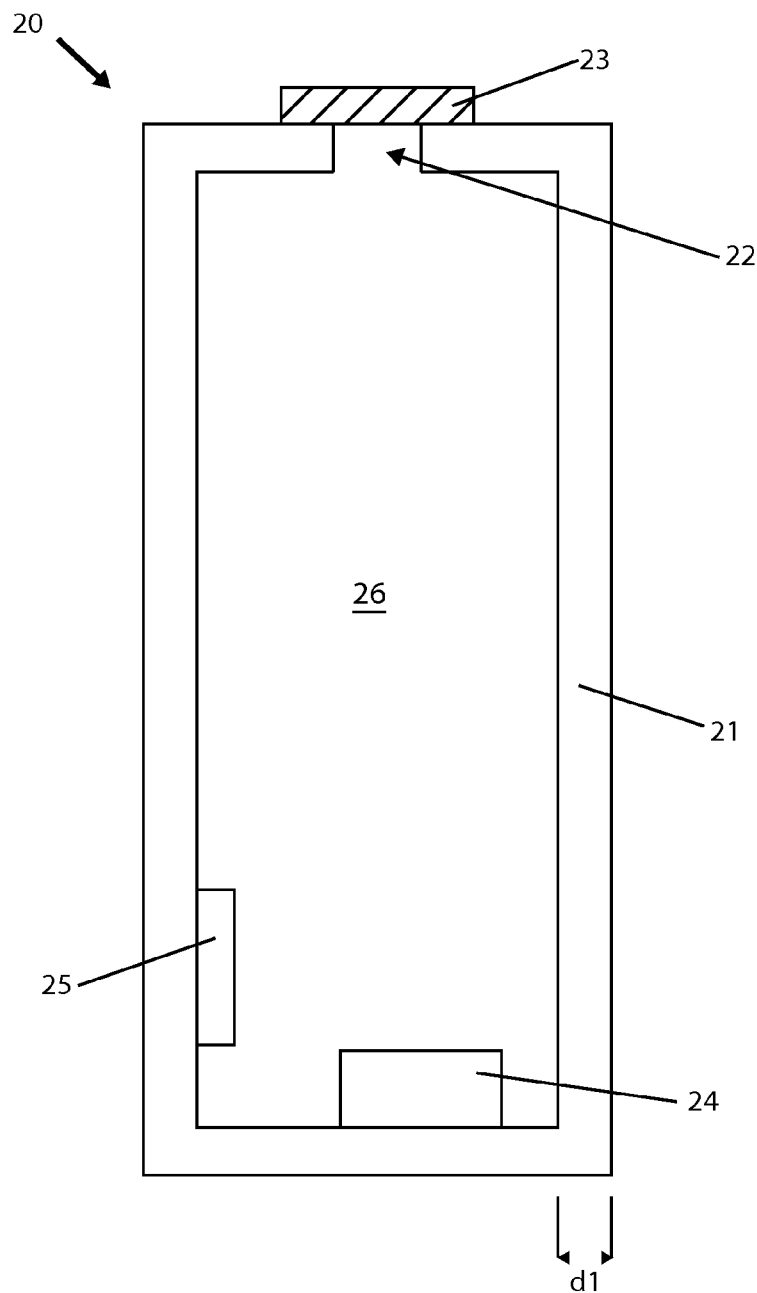
FIG. 2a Glass chamber with plug.

The present invention begins with an aluminosilicate material including, but not limited to those evaluated above for use as an optical window into a vacuum chamber. The window may alternately use soda lime glass. Referring next to FIG. 2a, vacuum chamber 20 has size desired from about 100 mm in length to about 1 mm in length and the shape of a cube. Other embodiments could be rectangular with size about 150 mm by about 25 mm as displayed in the figure. The walls 21 can be glass as shown. The walls 21 can be used as an optical window. An aluminosilicate material or soda lime glass as noted above is used as glass 21. The wall thickness d1 can range from about 0.1 mm to about 20 mm. Hole 22 is used to evacuate the cavity 26. The plug 23 is made from a material that can be bonded to glass 21 and can be made from materials including, but not limited to, glass, silicon, or metal. Some applications may contain a target atom injector 25. This target atom injector 25 emits a specified plurality of atoms into the cavity 26. The specified atom may include, but is not limited to alkali metal atoms or alkali-earth atoms. Some applications may also contain an atom collector 24.

The atom collector 24 may be a passive device for collecting impurity atoms in cavity 26. Prior art atom collectors include devices known in the art as getters. Getters can be of the evaporable or non-evaporable nature. An example of an evaporable getter is a titanium or gold film formed by high temperature vapor deposition. An example of a non-evaporable getter (NEG) is a piece of carbon such as activated charcoal or various forms of graphite. NEG Pumps may also contain a blend of sintered metal powders including zirconium, vanadium, and iron such is commercially sold by SAES (R). Atom collector 24 and target atom injector may be unattached to glass 21, and left unconstrained in cavity 26. Atom collector 24 and target atom injector 25 could also be pre-fastened to plug 23. Atom collector 24 and target atom injector 25 could be films on glass 21 and could be vapor deposited onto glass 21 through hole 22.

Figure 2B:
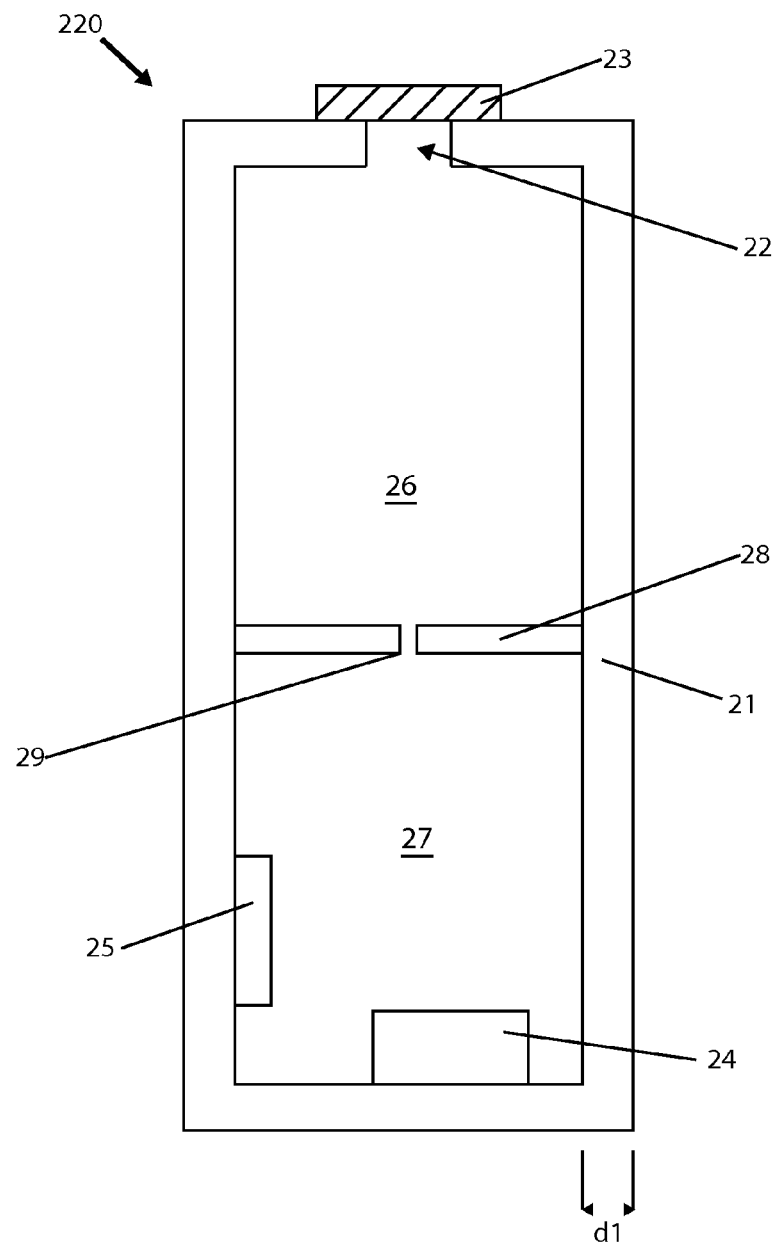
FIG. 2b Glass chamber with plug and divider.

Referring next to FIG. 2b, vacuum chamber 220 incorporates a divider 28 that separates the cavity into cavity 26 and cavity 27. Divider 28 may have fluid communication channel 29 from cavity 26 to cavity 27. An alternate embodiment (not shown) may have multiple dividers 28, cavities 26 and 27, and fluid communications 29 among all of the cavities. Atom collector 24 and atom injector 25 may reside in one or all of the cavities and may also be in separate cavities.

Figure 3:
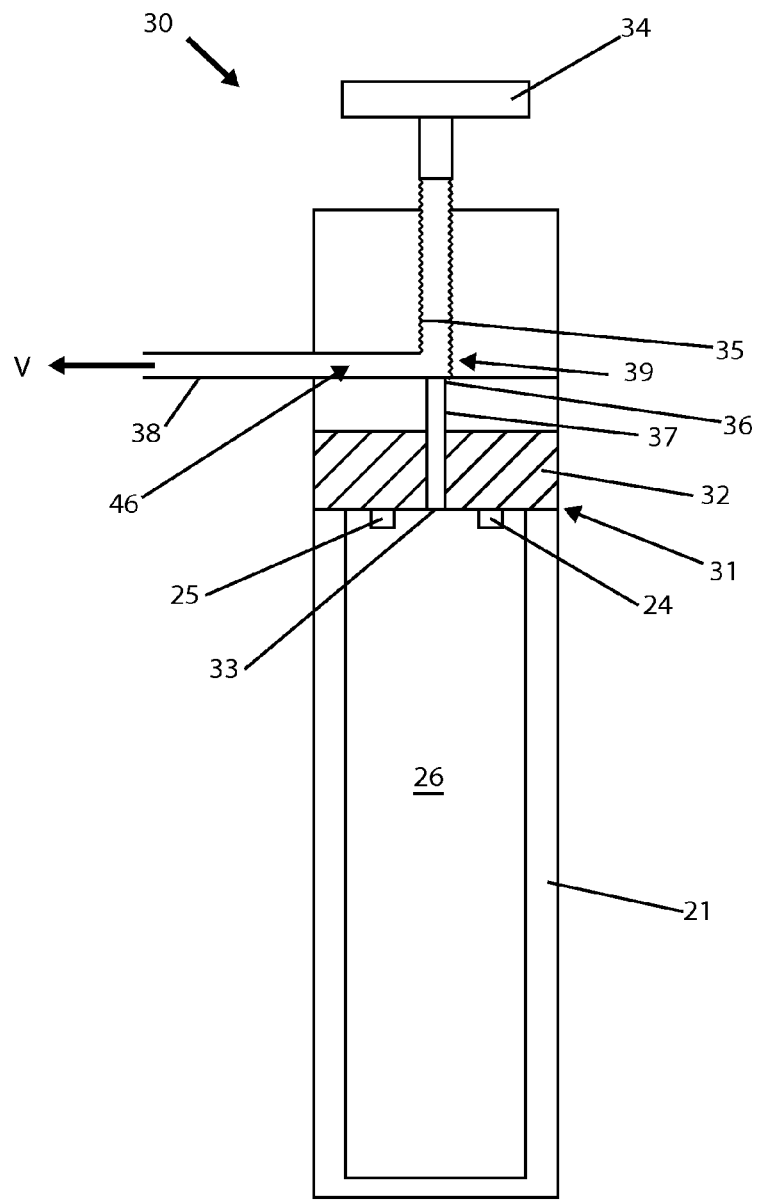
FIG. 3 Cell with valve.

Referring next to FIG. 3, vacuum chamber 30 has a different means of sealing its top. A metal flange 32 has an opening 33. Flange 32 is attached to glass 21 at a glass-to-metal interface 31. Prior art glass-to-metal seals include a metal cylinder sealed to a glass cylinder. In the prior art, the metals can be chosen to have similar expansion coefficients to that of glass 21. Port 37 of valve 39 is connected to flange 32. The valve 39 is constructed to have a threaded plug 34. Turning threaded plug 34 causes a sealing surface 35 to meet sealing surface 36 forming a vacuum tight seal. Evacuation port 40 exhausts to vacuum source V through pinchoff tube 38. Pinchoff tube 38 can be sealed by squeezing with a tool. It can later be reopened or replaced to re-apply vacuum to cavity 26. Atom collector 24 and target atom injector 25 could be optionally fastened to flange 32. A second lower flange (not shown) could comprise the bottom of the vacuum chamber 30 and support the atom collector 24 and target atom injector 25.

Figure 4:
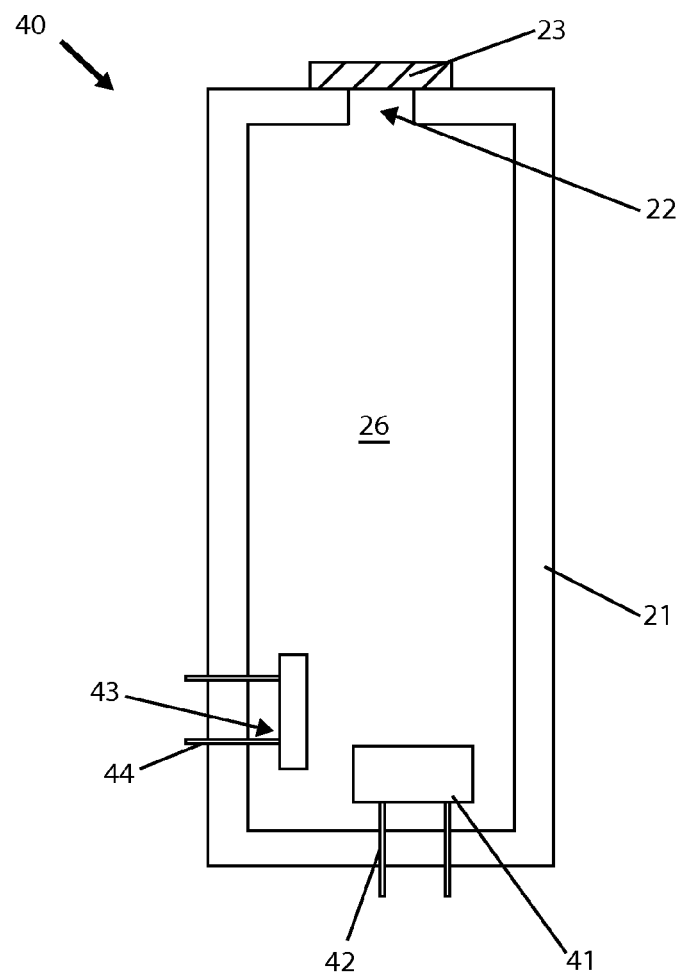
FIG. 4 Glass cell with electrically actuated injector and collector.

Referring next to FIG. 4, the vacuum chamber 40 has holes in glass 21 suited to seal in wires 44 for the target atom injector 43 and the wires 42 for the atom collector 41. As is well known in the art, all embodiments of the atom collector and target atom injector may contain electrical wires for electrical activation and operation.

The shape of the chambers 20, 220, 30, and 40 could have a regular cross-section such as a square, pentagon, hexagon, octagon or circle. Additionally the chambers may have non-regular cross-sections incorporating multiple windows at various angles and may not be prismatic in shape.

Figure 5A:
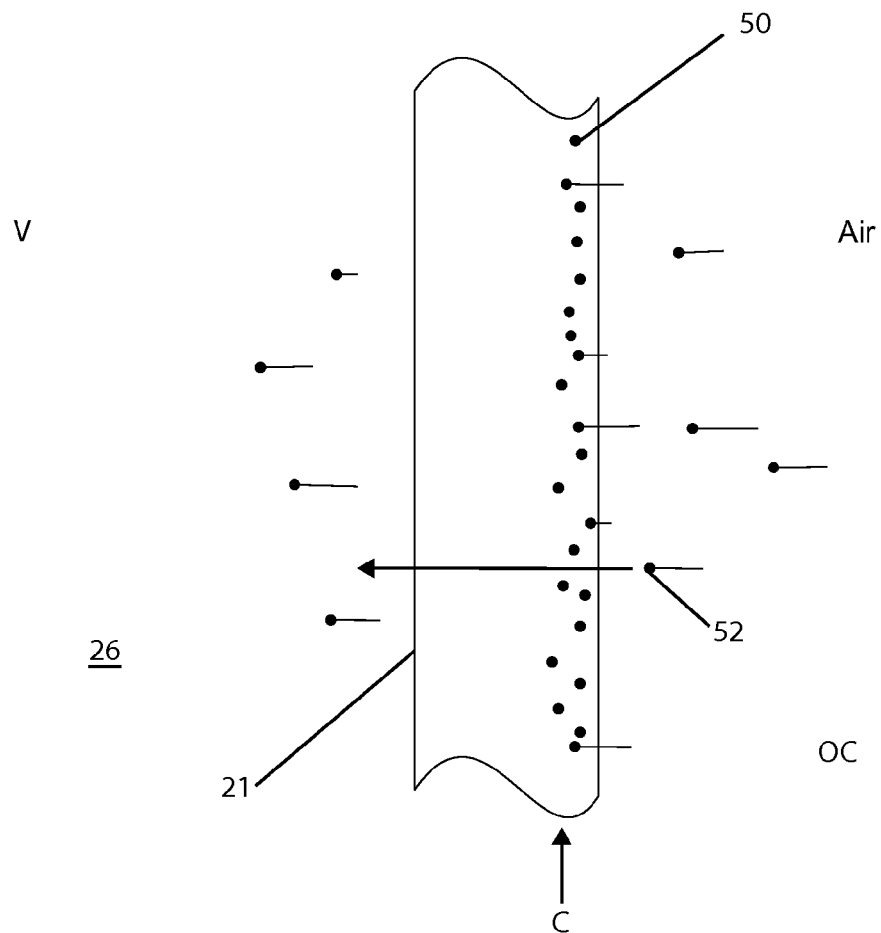
FIG. 5a (Prior art) Cross-section of window exposed to air on one side and vacuum on the other.

Referring next to FIG. 5a, vacuum impurities 50 are distributed in the glass 21. By vacuum impurity we mean impurities that can migrate out of the glass 21 when exposed to a vacuum V, further contaminating cavity 26. Most dangerous to contaminating the cavity 26 are vacuum impurities 50 consisting of helium atoms which have atomic radius of about 31 picometers and are chemically inert. Materials exposed to air during storage or manufacturing will contain helium atoms 50. For a sealed and evacuated vacuum cavity 26, a helium atom 52 from the outside of the chamber OC can migrate through to the inside cavity 26. The pattern of helium migration through 21 forms a column C of high concentration helium 50 at the air-glass boundary. From column C individual helium atoms 50 can permeate through glass 21 into cavity 26.

Referring next to FIG. 5b, the present invention degassing method is shown. Glass 21 could be an entire container or a segment such as a window for a vacuum chamber. Glass 21 is heated by heat H to a temperature range of about 50 C to about 450 C. Heat H could be applied by radiative heating such as using a laser or a nearby hot body, or by direct contact with a hot body. Helium impurities 50 diffuse out of glass 21. Vacuum V is simultaneously applied to both sides of the glass thus removing helium 50 from glass 21. Vacuum V can range from about $10^{-4}$ torr to about $10^{-13}$ torr. This process is continued for between about $3\times10^2$ seconds to about $3\times10^7$ seconds. After degassing, a final partial pressure of helium impurities 50 less than about $10^{-4}$ torr is obtained at both of the surfaces of glass 21.

Example 1: We used an ASG Corning(R) 1720 glass tube about 25 mm in diameter with a material thickness of about 1.5 mm. The tube was attached at both ends to a glass-to-metal seal. Each seal contained a CF1.33 vacuum flange. A SAES(R) rubidium dispenser model RB/NF/7/25 FT10+10 was used as an atom injector. A SAES(R) non-evaporable getter model ST172/HI/7-6/150C was used as an atom collector. Both the injector and collector were spot welded to a vacuum electrical feedthru on a CF1.33 vacuum flange. The injector/collector assembly was attached to the tube assembly by bolting the CF1.33 flanges together. A vacuum valve from VAT(R) model 54024-GE02 was attached by the CF1.33 flange to the other side of the tube assembly. Furthermore a copper pinchoff tube connected the vacuum valve to the processing pumping apparatus. The apparatus consisted of a UHV turbo pump and a UHV ion pump. The vacuum chamber, not including the processing pumping apparatus, had a volume of about 104 cc. The chamber was heated directly using resistive heating cord and infrared heaters to a temperature of about 250 C for about 4 weeks while the pumping apparatus continued to remove impurities from the chamber. The chamber was then allowed to cool to about 25 C after which, the vacuum valve was closed. The pinchoff tube was then squeezed which had the effect of severing the vacuum chamber from the processing pumping apparatus. Atoms were laser cooled and trapped in the chamber by first applying electrical current of about 2.5 A to the atom injector and then applying three sets of orthogonal pairs of antiparallel laser beams at 780 nm to the volume of the vacuum chamber. A magnetic field gradient was added to the volume using a set of external coils in an anti-Helmholtz configuration. The fluorescence of the atoms was monitored on a photodiode and on a near infrared video camera. The laser cooling was maintained without active pumping.

Referring next to FIG. 5c shows an alternate present invention degassing method. Glass 21 could be an entire container or a segment such as a window for a vacuum chamber. Glass 21 is heated by heat H to a temperature range of about 50 C to about 450 C. Heat H could be applied by radiative heating such as using a laser or a nearby hot body, by direct contact with a hot body, or by convective heating with a hot gas. Helium impurities 50 diffuse out of glass 21. A low helium concentration environment is achieved by applying a high-purity purge gas 51, as one example nitrogen, simultaneously applied to both sides of the glass thus removing helium 50 from glass 21. Purge gas 51 must have a helium concentration such that the helium partial pressure in purge gas 51 is less than about $10^{-4}$ torr. The process of applying heat H and purge gas 51 is continued for between about $3\times10^2$ seconds to about $3\times10^7$ seconds. After degassing, a final partial pressure of helium impurities 50 less than about $10^{-4}$ torr is obtained at both of the surfaces of glass 21.

Referring next to FIG. 5d shows an alternate present invention degassing method. Glass 21 could be an entire container or a segment such as a window for a vacuum chamber. Glass 21 is heated by heat H to a temperature range of about 50 C to about 450 C. Heat H could be applied by radiative heating such as using a laser or using a nearby hot body, by direct contact with a hot body, or by convective heating with a hot gas. Helium impurities 50 diffuse out of glass 21. A low helium concentration environment is achieved in cavity 26 by applying vacuum V thus removing helium 50 from glass 21 from the inside of glass 21. A low helium concentration environment is achieved on the outside of glass 21 by applying a high-purity purge gas 51, as one example nitrogen, to the outside of the glass 21 thus removing helium 50 from the outside of glass 21. Purge gas 51 must have a helium concentration such that the helium partial pressure in purge gas 51 is less than about $10^{-4}$ torr. The process of applying heat H, vacuum V and purge gas 51 is continued for between about $3\times10^2$ seconds to about $3\times10^7$ seconds. After degassing, a final partial pressure of helium impurities 50 less than about $10^{-4}$ torr is obtained at both of the surfaces of glass 21.

Figure 6A:
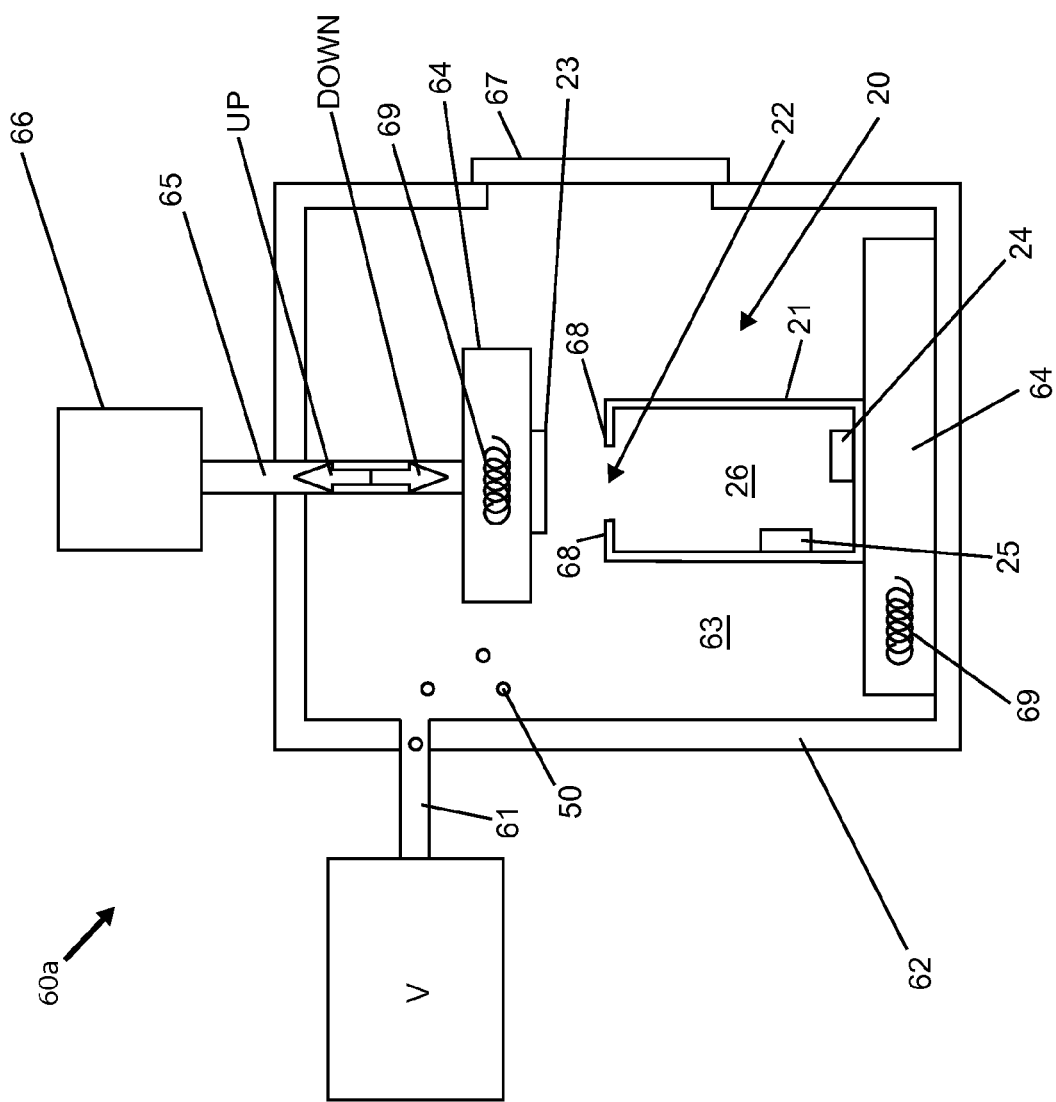
FIG. 6a Proposed schematic drawing of vacuum chamber processing, degasification and sealing setup.

Referring next to FIG. 6a, a proposed degassing and sealing apparatus 60a is shown. We start with a vacuum enclosure for processing 62 which has an access panel 67 to enable the placement of a vacuum chamber 20 therein. Vacuum enclosure 62 is preferably constructed of stainless steel or aluminum. Panel 67 may incorporate an inspection window (not shown). Panel 67 could also be a gate valve that separates the vacuum enclosure for processing 62 from a sample load-lock enclosure (not shown). A platform 64 anchors vacuum chamber 20 for processing. A plug 23 is removably connected to the plug holder 64. The plug holder 64 also incorporates a heating element 69. The plug holder 64 can be moved up and down (see arrows Up, Down) by a position actuator 66 which powers a motional feedthru 65. Position actuator could be a manually driven screw, an electric motor, or pneumatic actuator. Alternately, plug holder 64 could be manipulated by a electrically actuated translation stage (not shown) internal to the processing chamber. Vacuum pump V has a fluid communication 61 with the process chamber 63. For processing, the vacuum at 63 ranges from about $10^{-6}$ torr to about $10^{-13}$ torr. The aluminosilicate glass 21 is from about 0.1 mm to about 10 mm in thickness and we predict a processing time interval ranging from about 3 days to about 3 months. During this vacuum processing time interval the vacuum chamber 20 is heated by heater 69 in the platform 64. Alternately the vacuum enclosure for processing 62 could be heated externally (not shown). The temperature of vacuum chamber 20 is maintained at a value ranging from about 50 C to about 450 C, during the processing time interval. At the end of the helium impurity 50 evacuation process, the plug 23 sealing operation begins.

Plug 23 is preferably made out of the same type of material as the glass 21. The mating surfaces 68 of the vacuum chamber 20 and the plug 23 have been prepared to a flatness ranging from about lambda/5 to about lambda/50 where lambda is 633 nm prior to placement into degassing and sealing apparatus 60a. The surfaces of plug 23 and mating surfaces 68 may be cleaned with an acid such as HF or a base such as KOH prior to placement into degassing and sealing apparatus 60a. Plug 23 is lowered against the mating surface 68 of vacuum chamber 20 using the position actuator 66. The heater 69 in plug holder 64 is actuated to a temperature of about 50 C to about 450 C. The heater 69 has the effect of raising the temperature of the glass 21 at mating surface 68 to a value ranging between 50 C and 450 C. The temperature is sustained for a time ranging between about 3 hours to about 3 days. At that point the vacuum chamber 20 can be removed and used for application including, but not limited to, optical cooling of atoms, magnetic sensing, gravitational sensing, and quantum information. It is estimated that a commercially viable vacuum chamber 20 may range from about 1 cubic mm to about 1 liter. After vacuum processing, the outside of glass 21 (of chamber 20) may be machined to reshape or true the outer surfaces using common glass grinding and polishing techniques known in the art.

Figure 6B:
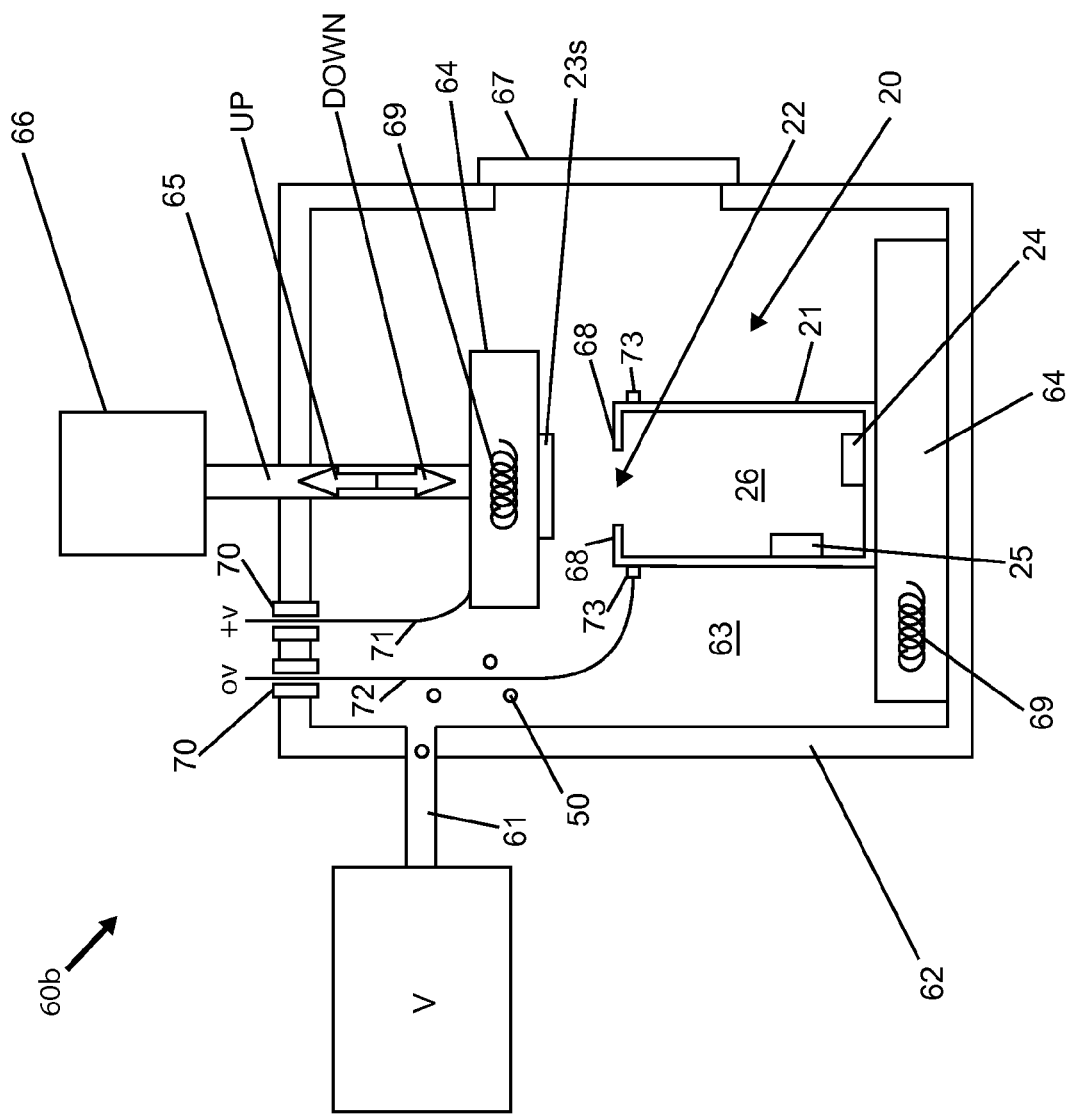
FIG. 6b Proposed schematic drawing of anodic bonding method of sealing plug.

Referring next to FIG. 6b, the processing and degassing apparatus 60b has a positive charged conductor 71 that passes through the insulator 70 to the plug holder 64 which is electrically conductive. A conductive wire 72 at a lower potential such as ground may pass through an insulator 70 and connect to an electrode 73 that is in physical contact with glass 21 on or adjacent to mating surface 68. Alternately, the insulator 70 can be eliminated and conductive wire 72 may connect to directly to the inside of vacuum enclosure 62 if the potential on vacuum enclosure 62 is maintained near about ground (not shown). Plug 23S is preferably made from silicon. The mating surfaces 68 of the vacuum chamber 20 and the plug 23S have been prepared to a flatness ranging from about lambda/5 to about lambda/50 prior to placement into degassing and sealing apparatus 60b. The surfaces of plug 23S and mating surfaces 68 may be cleaned with an acid such as HF or a base such as KOH prior to placement into degassing and sealing apparatus 60b. When the plug 23S is pressed into contact with the surface 68, the circuit is completed wherein a current flows from the plug holder 64 through the glass 21 to the electrode 73 and back through the conductive wire 72. Heat is applied through heater 69 raising the mating surface 68 to a temperature ranging from about 100 C to about 450 C. The voltage applied to conductor 71 ranges from about 500 volts to about 2000 volts. It is estimated that a time period ranging between about 5 minutes and about 1 hour is needed to complete a leak-tight bond. This process is known as anodic bonding. See US patent number U.S. Pat. No. 7,807,509 B2 incorporated herein by reference. See especially FIG. 2a.

Figure 6C:
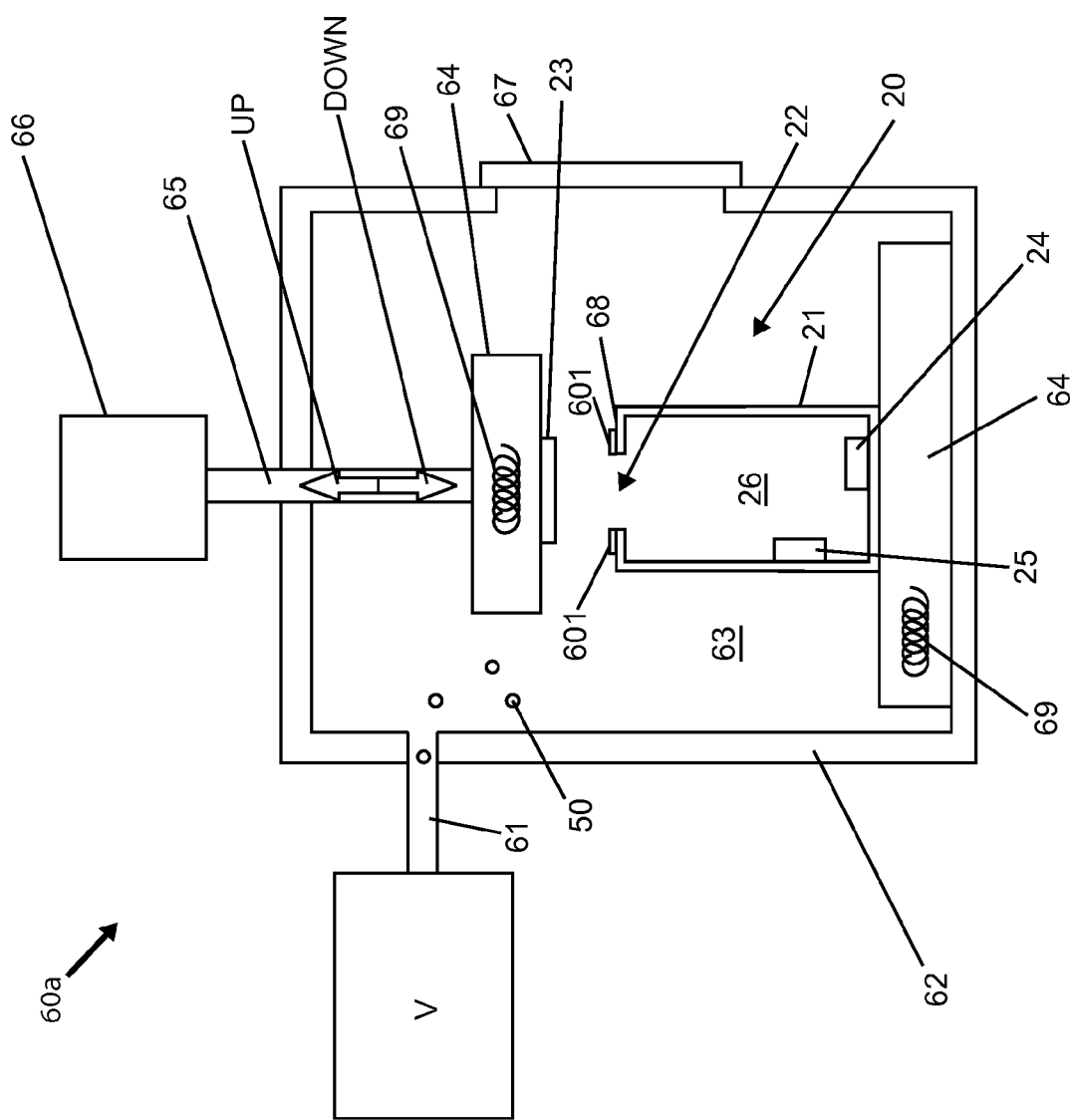
FIG. 6c Proposed schematic drawing of using indium bonding method to seal plug.

Referring next to FIG. 6c, an indium film 601 is deposited onto mating surface 68. The indium film 601 may be in the form of an indium foil ranging in thickness from about 0.020 mm to about 1 mm. Indium film 601 may also be applied previously to mating surface 68 using vapor deposition or by electroplating (both techniques being known in the art) with indium thickness ranging from about 0.005 mm to 0.1 mm. For vapor deposition or electroplating, a metal base layer may be used composed from a combination of metals, including, but not limited to Cu, Ag, Au, Cr, Mo, and W. The process of degassing material 21 is the same as described above. Plug 23 is lowered against the indium film 601 on mating surface 68 of vacuum chamber 20 using the position actuator 66. The heater 69 in plug holder 64 is actuated to a temperature of about 50 C to about 250 C. The heater 69 has the effect of raising the temperature of the glass 21 at mating surface 68 to a value ranging between 50 C and 250 C. The temperature is sustained for a time ranging between about 10 minutes to about 10 hours.

Referring next to FIG. 7, shown is the present invention vacuum processing and degassing apparatus 80. Vacuum chamber embodiment 30 as described above is incorporated into vacuum processing apparatus 80. We start with a vacuum enclosure 81 for processing which has an access panel 67 to enable the placement of a vacuum cell 30 therein. Vacuum enclosure 81 is preferably constructed of stainless steel or aluminum and is heated from the outside by a heater (not shown). Panel 67 may incorporate an inspection window (not shown). At least one vacuum pump V has fluid connection 83 through vacuum port 82 to pinchoff tube 38. Vacuum pump V has fluid connection 84 to process vacuum space 63. Vacuum pump V could be bifurcated or two separate pumps. The procedure for degassing glass 21 is the same as described above in FIG. 6a and FIG. 5b. The aluminosilicate glass 21 is from about 0.1 mm to about 10 mm in thickness and we predict a processing time interval ranging from about 3 days to about 3 months. During this vacuum processing time interval the vacuum chamber 20 is heated indirectly by heating the vacuum enclosure 81 from the outside with a resistive or radiative heater (not shown) or a flame. The temperature of the enclosure 81 is maintained at a value ranging from about 50 C to about 450 C, during the processing time interval. Enclosure 81 heats apparatus 30 indirectly from heat conducted through pinchoff tube 38 and heat radiated inward from the walls of enclosure 81. At the end of the helium impurity 50 evacuation process, the outer volume 63 is returned to ambient pressure. The access panel 67 is removed.

The valve 39 is closed. The pinchoff tube 38 is closed. The apparatus 30 is removed and ready for service.

Apparatus 30 can reevacuated at a later time. The used pinchoff tube 38 is removed and replaced. Apparatus 30 is replaced into the processing and degassing apparatus 80 through access panel 67. The open end of the pinchoff tube 38 is sealed to port 82. Vacuum V is activated, the valve 39 is opened, and access panel 67 is closed. The evacuation process is repeated as described above.

Next referring to FIG. 8, apparatus 30 is placed into a purge gas enclosure 95. Enclosure 95 incorporates a port 91. A purge gas supply GAS, injects a desired purge gas 51 into volume 92 via inlet tube 93. Excess purge gas 51 and helium impurities 50 exhaust through port 91. Purge gas 51 may be a number of gases including, but not limited to nitrogen, argon, $CO_2$, as anyone skilled in the art may select. Purge gas 51 must be pure of helium. All other process variables are as described in FIG. 7.

Referring next to FIG. 9a, a bar 100 composed primarily of glass is made from a base 101, spacer 102, spacer 103 and a top 104. Base 101, spacer 102, spacer 103 and a top 104 can range in length from about 5 mm to about 200 mm. Base 101, spacer 102, spacer 103 and a top 104 can range in thickness from about 0.1 mm to about 20 mm. Base 101, spacer 102, spacer 103, top 104 may be composed exclusively or in part by glass 21. Spacer 102 and spacer 103 are placed on base 101. Top 104 is placed on spacer 102 and spacer 103 forming a channel 105. Adjoining surfaces 130 are bonded together. One of a variety of bonding techniques can be used including, but not limited to, optical contact bonding, chemically assisted optical contact bonding, anodic bonding, or direct diffusion bonding. To one skilled in the art of glass bonding, these are all known techniques. Adjoining surfaces 130 and cavity surfaces 131 are previously prepared before bonding to be flat ranging from about lambda/5 to about lambda/50 using standard glass polishing techniques known in the art. Lambda is 633 nm.

Referring next to FIG. 9b, a bar 100 is cut along line 104 forming in FIG. 9c, a slice 110. Exposed front and back surfaces 106, which have a normal vector along the direction of channel 105, are polished to a flatness ranging from about lambda/5 to about lambda/50.

Figure 9D:
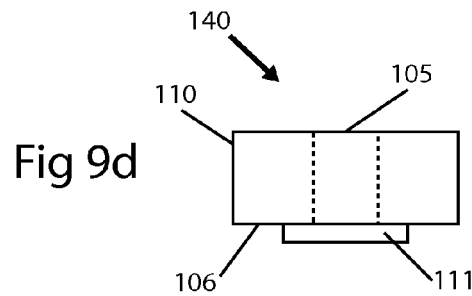
FIG. 9 Miniature cold atom vacuum chamber.

Referring next to FIG. 9d, a cap 111 is bonded to one exposed surface 106 to form chamber 140. Cap 111 may be composed exclusively or in part by glass 21. One of a variety of bonding techniques can be used including, but not limited to, optical contact bonding, chemically assisted optical contact bonding, anodic bonding, or direct diffusion bonding.

Figure 9E:
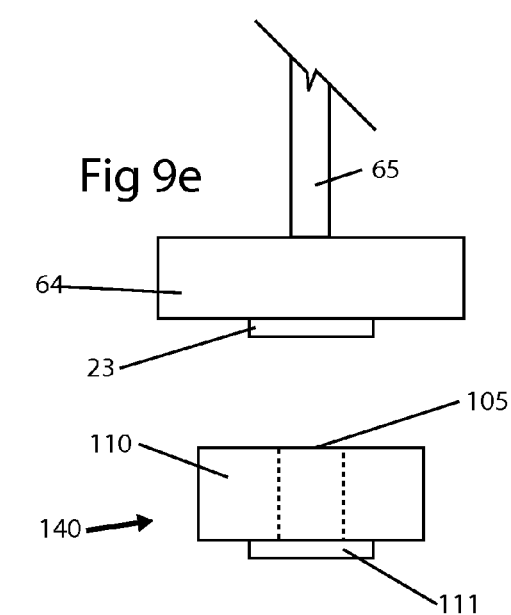

Referring next to FIG. 9e, assembly 140 is placed into a processing apparatus such as degassing and sealing apparatus 60a or 60b as shown in FIGS. 6a, 6b. A plug 23 is removably connected to the plug holder 64. Plug 23 may be composed exclusively or in part by glass 21. The plug holder 64 can be moved up and down by a motional feedthru 65. Vacuum processing, degassing, and sealing is performed the same as described in FIG. 6a or FIG. 6b. One way of forming the embodiment 220 of FIG. 2b would be to us a plug 23 (not shown) that has a hole in it which would form fluid communication channel 29. Next another chamber 140 would be attached over the plug 23 with the hole to form the multiple chamber embodiment 220 of FIG. 2b.

Figure 9F:
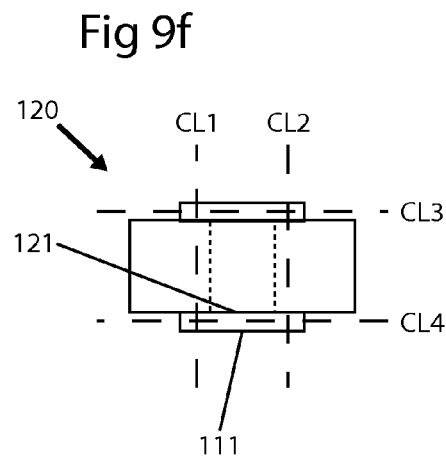

Referring next to FIG. 9f, chamber 140 is removed from the processing apparatus such as degassing and sealing apparatus 60a or 60b. Chamber 120 is machined along cut lines CL1, CL2, CL3, and CL4 using standard glass machining techniques such as glass sawing or glass grinding which are known in the art. Additional cut lines (not shown) may also be performed. Rough surfaces such as those along cut lines CL1, CL2, CL3, and CL4 may be polished to an optical flatness ranging from about lambda/1 to about lambda/50 using standard glass polishing techniques known in the art. Other surfaces of chamber 140 may also be polished.

Figure 9G:
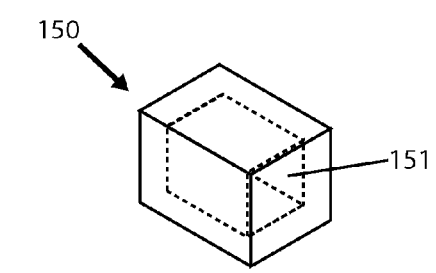

Referring next to FIG. 9g, executing the cut lines as noted in FIG. 9f results in the vacuum chamber 150. Cavity 151 may have a volume as small as about 0.001 $mm^3$ or as large as about 8 $cm^3$. The wall thickness may be as small as about 0.001 mm or may be as large as about 200 mm. Applications can include optical wavelength references, a container for optically cooled atoms, inertial sensors, gravity sensors, magnetic field sensors, atomic clocks, and atomic oscillators.

Example 2: We constructed micro vacuum chambers from fused silica glass. We started with four pieces; a bottom, a top, and two spacers. The bottom piece was 100 mm wide, 40 mm long, and 2 mm thick. The top piece had the same dimensions. The two spacers were each 4 mm wide, 40 mm long, and 2 mm thick. The pieces were polished to better than lambda/10 at surfaces that were to undergo bonding. Two different bonding methods were used. In one case we used optical contact bonding. The pieces were cleaned thoroughly using solvents, acetone, IPA, and a basic cleaning agent KOH, and water. The spacers were stacked onto the bottom piece leaving a uniform gap between the spacers. An optical contact bond was formed by applying pressure by hand at the bond joint. The top was then stacked onto the spacers forming a bar with an open channel. Once again, an optical contact bond was formed. In another case we repeated these steps, but substituted optical contact bonding with diffusion bonding. The stacks were aligned and placed into an oven. In the oven, pressure of about 6 to ten PSI was applied to the stack while the temperature was raised to about 1100 C for 6 Hours. This temperature was chosen to be about near the strain point of the glass and not exceed the softening point of the glass. After bonding, the bar was cut into slices that were 2 mm thick. The front and back faces of the slices were polished to a flatness of about lambda/10. Flat windows measuring 6 mm, by 8 mm, by 2 mm thick were bonded over the channel using both bonding techniques forming a sealed cavity. In the case of those that were bonded using diffusion bonding, a vacuum was created inside the cavity due to expansion and contraction of the gas that filled the cavity during heating and cooling. The assembly was cut along planes parallel to surfaces that form the cavity. The cut planes were then polished. The final micro vacuum chambers measured 4 mm×4 mm×4 mm, with an internal cavity that measured 2 mm×2 mm×2 mm.

Figure 10:
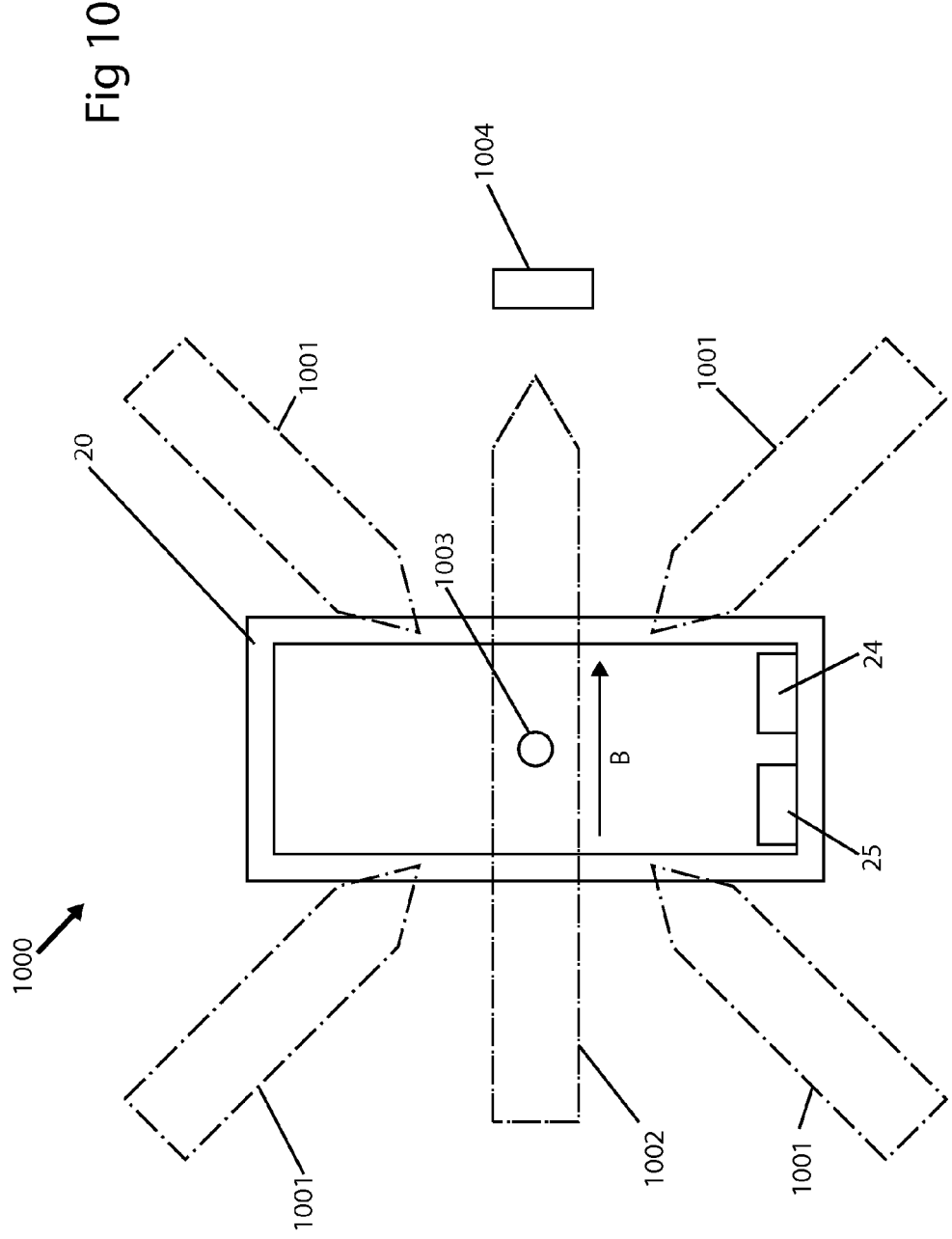
FIG. 10 Optically cooled atom instrument.

Referring next to FIG. 10, a cold atoms instrument 1000 consists of crossed laser beams 1001 that meet about near the center a vacuum chamber such as 20 shown in FIG. 2. The crossed laser beams 1001 can have a typical intensity ranging from about 1 $mW/cm^2$ to about 100 $mW/cm^2$. Vacuum chamber 20 can be substituted with vacuum chamber 30, vacuum chamber 40, or vacuum chamber 140 as described earlier. Target atom injector 25 is actuated to dispense target atoms into the volume of the vacuum chamber 20. A set of magnetic coils (not shown) provide a magnetic field gradient ranging from about 1 Gauss/cm to about 100 Gauss/cm. A collection of cooled atoms 1003 forms where the crossed laser beams 1001 intersect. The collection of cooled atoms 1003 can be adjusted from about 1 atom to about $10^{10}$ atoms by varying the intensity of the crossed laser beams 1001 and the magnetic field gradient at the location of the atoms. Background atom collector 24 helps to maintain low operating pressures. A probe laser 1002 addresses the collection of cooled atoms 1003. A detector 1004 is used to sense light emitted or absorbed by the collection of cooled atoms 1003. The temperature of the collection of cooled atoms 1003 can range from about 1 millikelvin to about 0.1 nanokelvin. Various properties of the collection of cooled atoms 1003 can be measured including, but not limited to, the number of atoms, the atom temperature, the atoms' quantum state, the pressure in the vacuum chamber 20, magnetic energy shifts, energy shifts related to inertial excitement of the atoms, quantum phase, and energy of atomic levels. An example is shown that the flux density of magnetic field B may be measured.

Figure 11:
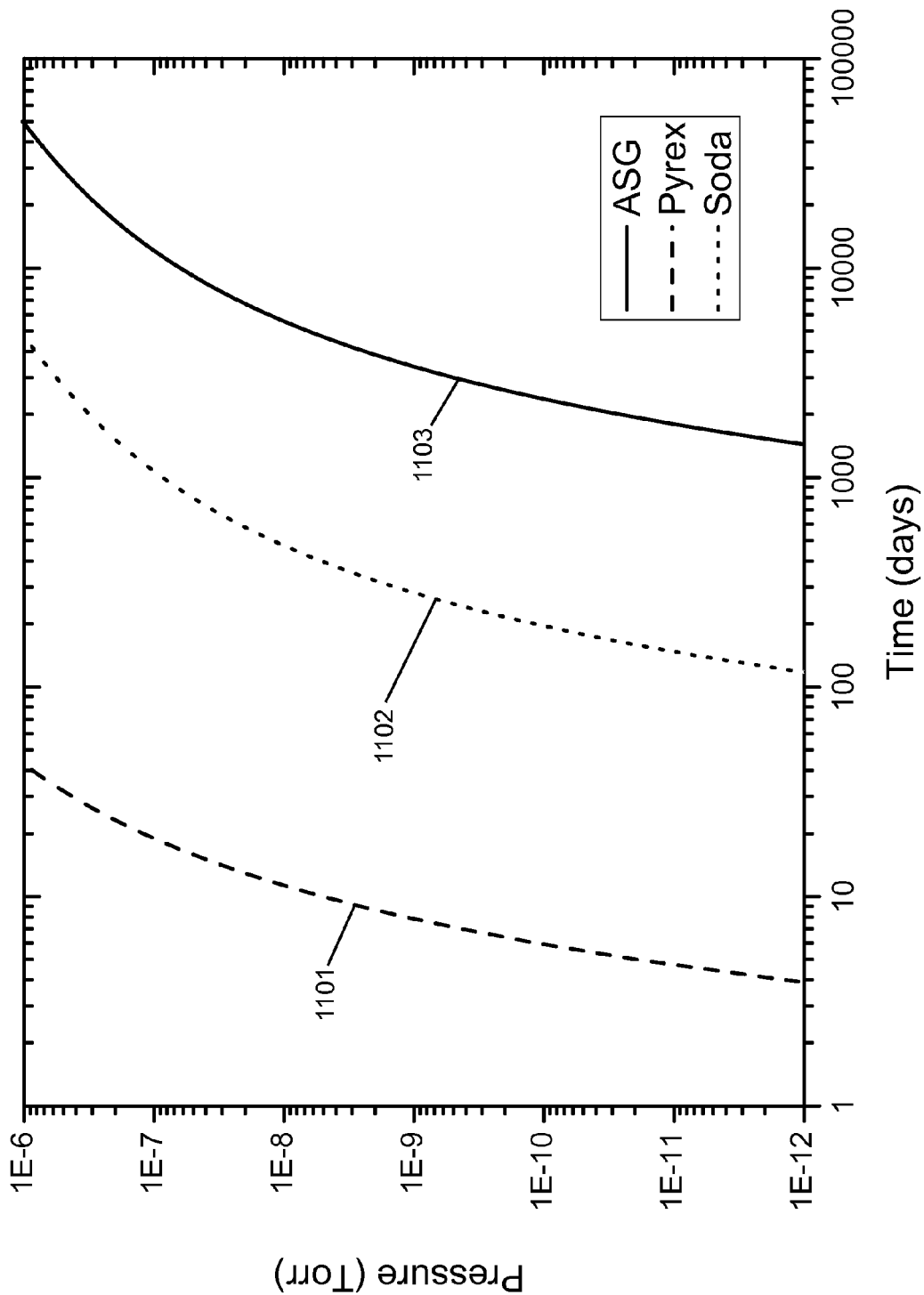
FIG. 11 Permeation of helium into processed atom chamber of various materials.

Referring next to FIG. 11, the horizontal component represents a time delay in days. The graph represents the accumulation of helium in a closed glass vacuum chamber as a function of time. The helium partial pressure is plotted on the vertical component for glass vacuum chambers where the glass has been properly degassed as described above. The calculation is performed for glass vacuum chambers constructed from three different glass types and having a size of 3.5 cm×3.5 cm×5 cm and window thickness of 2. Dashed line 1101 shows helium partial pressure inside the chamber as a function of time for a vacuum chamber made from borosilicate glass. Dotted line 1102 shows helium partial pressure inside the chamber as a function of time for a vacuum chamber made from soda-lime silica glass. Solid line 1103 shows helium partial pressure inside the chamber as a function of time for a vacuum chamber made from aluminosilicate glass. A typical pressure at which optical cooling begins to fail is about $10^{-8}$ torr. Setting this as our failure criteria, dashed line 1101 shows that the present invention constructed from borosilicate glass would have a device lifetime of about 10 days. Dotted line 1102 shows that the present invention constructed from soda-lime silica glass would have a device lifetime of about 450 days. Solid line 1103 shows that the present invention constructed from aluminosilicate glass would have a device lifetime of about 4500 days.

Figure 12:
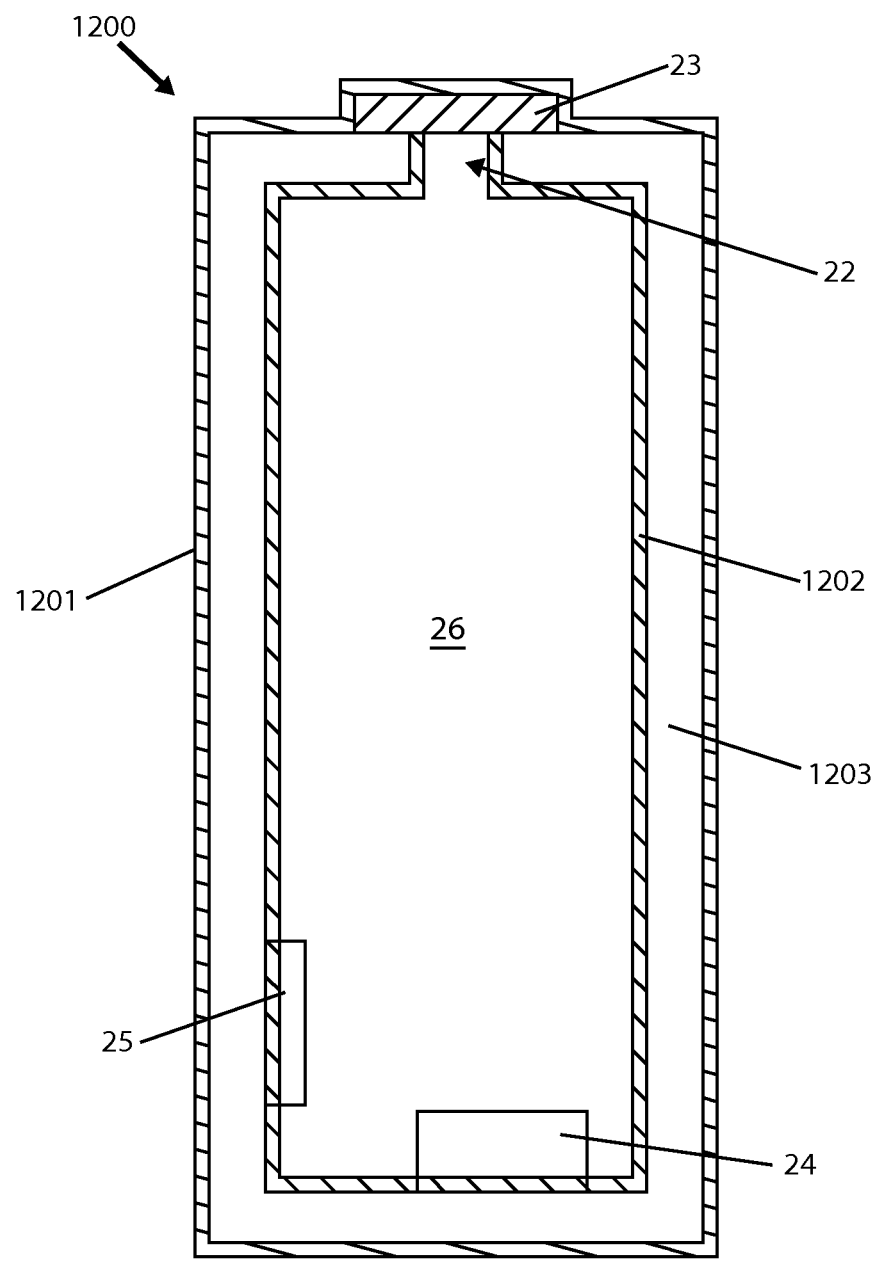
FIG. 12 Helium barrier coatings on vacuum chamber.

Referring next to FIG. 12, a vacuum chamber 1200 may be constructed from a variety of types of glass 1203, including those that have a high helium permeability. Helium permeation rates may be reduced by depositing a coating 1201, with low helium permeability, onto the outside of glass 1203 and plug 23. Coating 1202, with low helium permeability, may be deposited to the inside of glass 1203 and plug 23. Possible coating materials for coatings 1201 and 1202 include, but are not limited to, graphene and aluminum oxide. The coatings may be applied to the inside of the vacuum chamber 1200, to the outside of the vacuum chamber 1200, or to both. The coating may be deposited prior to, subsequent to, or as part of the vacuum processing described above. Coatings 1201 and 1202 can range in thickness from 0.335 nm to 0.1 mm. The coatings 1201 and 1202 may be deposited using wet chemistry techniques such as dip coating which is known in the art. Alternately, the coatings may be deposited using vapor deposition which is known in the art. The evacuation and sealing method noted above would remain the same to utilize vacuum chamber 1200.

Although the present invention has been described with reference to the disclosed embodiments, numerous modifications and variations can be made and still the result will come within the scope of the invention. No limitation with respect to the specific embodiments disclosed herein is intended or should be inferred. Each apparatus embodiment described herein has numerous equivalents.

We claim:

1. A sealed vacuum chamber comprising:
    an enclosure having a pressure in the range of about $10^{-7}$ to about $10^{-13}$ torr;
    said enclosure further comprising no active pumping means;
    said enclosure having at least one optically transparent window;
    said window further comprising an aluminosilicate glass having a helium permeability velocity below about $1\times10^{-13}$ cm$^2$/s at a temperature of about 25° C.;
    wherein the enclosure further comprises an atom injecting source;
    wherein the enclosure further comprises an atom collector;
    wherein the atom injecting source supplies a plurality of like atoms into the enclosure; and
    wherein an electromagnetic beam passing through the window effects an energy change to reduce the temperature of at least one like atom.

2. The chamber of claim 1, wherein the aluminosilicate further comprises a composition ranging from about 4% to about 80% of alumina by weight.

3. The chamber of claim 1, wherein said window has a thickness ranging from about 0.1 mm to about 2 cm.

4. The chamber of claim 1, wherein the enclosure further comprises a glass panel structure having at least four glass panels.

5. The chamber of claim 4, wherein the enclosure further comprises a rectangular cross section.

6. The chamber of claim 1 further comprising an all glass structure having a rectangular cross section in at least one plane and having an enclosure volume of less than about 250 cubic cm.

7. The vacuum chamber of claim 1, wherein said optically transparent window has an average helium concentration within the glass that corresponds to a surface pressure that is less than about $10^{-4}$ torr.

8. The vacuum chamber of claim 1 further comprising a port that can be reopened for subsequent recharging.

9. The vacuum chamber of claim 1, wherein the enclosure further comprises at least 2 cavities separated by a barrier which has a fluid communication channel between the cavities.

10. The vacuum chamber of claim 9, wherein the cavities are composed of an aluminasilicate glass and wherein at least one of the cavities has a volume smaller than about 8 cm$^3$.

11. A sealed vacuum chamber comprising:
    an enclosure having a pressure in the range of about $10^{-7}$ to about $10^{-13}$ torr;
    said enclosure having at least one optically transparent window;
    said enclosure further comprising no active pumping means;
    wherein the optically transparent window is composed of an aluminosilicate glass and further comprises a layer of helium barrier material having a thickness ranging from about 0.335 nm to about 0.1 mm;
    wherein the enclosure further comprises an atom injecting source;
    wherein the enclosure further comprises an atom collector;
    wherein the atom injecting source supplies a plurality of like atoms into the enclosure; and
    wherein an electromagnetic beam passing through the window effects an energy change to reduce the temperature of at least one like atom.

12. The vacuum chamber of claim 11, wherein the layer further comprises at least a single layer of graphene.

13. The vacuum chamber of claim 11, wherein the layer further comprises at least a single layer of aluminum oxide.

* * * * *